United States Patent
Kawai et al.

(10) Patent No.: US 7,149,491 B2
(45) Date of Patent: Dec. 12, 2006

(54) RADIO RECEPTION APPARATUS SYMBOL TIMING CONTROL METHOD, AND SYMBOL TIMING CONTROL PROGRAM

(75) Inventors: Katsutoshi Kawai, Daito (JP); Nobuhiro Masaoka, Moriguchi (JP)

(73) Assignees: Sanyo Electric Co., Ltd., Moriguchi (JP); Sanyo Telecommunications Co., Ltd, Daito (JP)

( * ) Notice: Subject to any disclaimer, the term of this patent is extended or adjusted under 35 U.S.C. 154(b) by 235 days.

(21) Appl. No.: 10/496,103

(22) PCT Filed: Nov. 18, 2002

(86) PCT No.: PCT/JP02/12031

§ 371 (c)(1),
(2), (4) Date: May 19, 2004

(87) PCT Pub. No.: WO03/045026

PCT Pub. Date: May 30, 2003

(65) Prior Publication Data

US 2005/0003776 A1    Jan. 6, 2005

(30) Foreign Application Priority Data

Nov. 20, 2001  (JP)  ............... 2001-354453

(51) Int. Cl.
*H04B 1/26* (2006.01)
*H04B 15/00* (2006.01)

(52) U.S. Cl. ............ 455/313; 455/205; 455/101; 455/139; 375/324; 375/326; 375/327

(58) Field of Classification Search ........... 455/313, 455/205, 101, 139, 182.1, 190.1; 375/324–329, 375/355, 373, 375–376, 342–348, 349, 260

See application file for complete search history.

(56) References Cited

U.S. PATENT DOCUMENTS

| | | | |
|---|---|---|---|
| 4,527,278 A | | 7/1985 | Deconche et al. |
| 5,805,619 A | * | 9/1998 | Gardner et al. ............ 714/814 |
| 5,898,741 A | | 4/1999 | Nagashima |
| 6,055,284 A | * | 4/2000 | Kweon ...................... 375/355 |
| 6,295,325 B1 | * | 9/2001 | Farrow et al. ............. 375/327 |
| 6,314,148 B1 | | 11/2001 | Fulghum |
| 6,985,549 B1 | * | 1/2006 | Biracree et al. ............ 375/355 |

(Continued)

FOREIGN PATENT DOCUMENTS

EP              1 102 419 A1    5/2001

(Continued)

OTHER PUBLICATIONS

Iinuma, T., et al., "An Adaptive Array Antenna PHS Base Station", Sanyo Technical Review, Sanyo Electric Co., Ltd., vol. 32, No. 1, pp. 80-88 (May 2000).

(Continued)

*Primary Examiner*—Matthew D. Anderson
*Assistant Examiner*—Tuan Pham
(74) *Attorney, Agent, or Firm*—Foley & Lardner LLP

(57) ABSTRACT

In a radio reception apparatus, a quadrature detector provides its digital output signal to a band-limiting filter after lowering a sampling frequency by a sampling frequency converter. Based on a correlation value obtained from an output of the band-limiting filter by a symbol timing detecting circuit, a symbol timing deviation detecting circuit detects a magnitude and a direction of a deviation of the timing of sampling in the sampling frequency converter, and controls timing of the sampling in the sampling frequency converter. Thereby, a symbol point of the correct timing is extracted.

19 Claims, 15 Drawing Sheets

U.S. PATENT DOCUMENTS

| | | |
|---|---|---|
| 2001/0015988 A1 | 8/2001 | Sawada et al. |
| 2002/0181572 A1* | 12/2002 | Meehan et al. ............. 375/229 |
| 2003/0139202 A1 | 7/2003 | Doi et al. |

FOREIGN PATENT DOCUMENTS

| | | |
|---|---|---|
| GB | 2 333 212 A | 7/1999 |
| JP | 8-23361 | 1/1966 |
| JP | 58-187046 | 11/1983 |
| JP | 61-222349 | 10/1986 |
| JP | 07-297871 | 11/1995 |
| JP | 11-168521 | 6/1999 |
| JP | 2000-101480 | 4/2000 |
| JP | 2000-341183 | 12/2000 |
| JP | 2001-230713 | 8/2001 |
| JP | 2001-237816 | 8/2001 |
| JP | 2001-285161 | 10/2001 |
| WO | WO 93/18593 A | 9/1993 |
| WO | WO 02/75956 A1 | 9/2002 |

OTHER PUBLICATIONS

Gardner, S., "Burst Modem Design Techniques: Part 2" Electronic Engineering, Morgan-Grampian, Ltd., London, GB, vol. 71, No. 875 (Dec. 1999).

Hosur, E., et al., "A PI/4-Shift QPSK Receiver for TDMA/TDD Systems" Conf. Record of the 31st Asilomar Conf. on Signals, Systems & Computers. Pacific Grove, CA, Nov. 2-5, 1997, Asilomar Conf. on Signals, Systems and Computers, Los Alamitos, CA, IEEE US, vol. 1 (Nov. 2, 1997).

* cited by examiner

FIG. 8

RADIO RECEPTION APPARATUS SYMBOL TIMING CONTROL METHOD, AND SYMBOL TIMING CONTROL PROGRAM

TECHNICAL FIELD

The present invention relates to a radio reception apparatus, a symbol timing control method and a symbol timing control program, and particularly to a radio reception apparatus, a symbol timing control method and a symbol timing control program, which are used, e.g., in a base station of a mobile communication system achieving fast and large-capacity communication such as data communication.

BACKGROUND ART

Conventional mobile communication systems such as PHS (Personal Handyphone System) employ modulation methods such as a π/4-QPSK (Quadrature Phase Shift Keying) method.

FIG. 13 is a function block diagram illustrating a structure of a radio reception apparatus forming, e.g., a base station of the convention PHS employing such a modulation method.

Referring to FIG. 13, antenna 1 receives an analog receive signal of a radio frequency, and sends it to a frequency converter circuit 2, which converts it to an analog receive signal of an intermediate frequency. An analog-to-digital converter 3 converts the analog receive signal of the intermediate frequency to a digital receive signal of a predetermined sampling frequency.

The digital receive signal is applied to a quadrature detector 4, and is subjected to quadrature detection or demodulation. To be exact, the output of quadrature detector 4 is formed of an in-phase component (I-component) and a quadrature component (Q-component). For the sake of illustration, however, FIG. 13 represents the output by one signal line.

The output of quadrature detector 4 is applied to a sampling frequency converter 5, which intermittently samples the received digital receive signal (thin out the signal) to convert the sampling frequency of the digital receive signal to a lower sampling frequency.

Sampling frequency converter 5 applies its digital signal output to a band-limiting filter 6 for band limitation. Band-limiting filter 6 is a roll-off filter formed of a well known FIR (Finite Impulse Response) filter or the like.

Band-limiting filter 6 provides its output to a symbol timing detecting circuit 7 as well as a symbol timing extractor 8. Based on the digital signal output of band-limiting filter 6 and known reference data, symbol timing detecting circuit 7 detects the timing of presence of a symbol point in the applied digital signal output, and applies a timing signal indicating the detected timing to symbol timing extractor 8.

Based on the timing signal provided from symbol timing detecting circuit 7, symbol timing extractor 8 extracts data of the symbol point from the digital signal output of band-limiting filter 6.

Symbol timing extractor 8 applies the extracted data of symbol point to a carrier phase and frequency offset compensator 9, which compensates for offset in carrier phase and frequency.

Carrier phase and frequency offset compensator 9 applies its output to a determining portion 10, which determines the symbol point on an I-Q coordinate plane based on the known π/4-QPSK method, and provides a result of this determination as demodulated data.

FIG. 14 is a block diagram specifically illustrating structures of symbol timing detecting circuit 7 and symbol timing extractor 8 illustrated in FIG. 13.

Referring to FIG. 14, I- and Q-components forming the digital signal provided from band-limiting filter 6 in FIG. 13 are applied to a correlator 7a of symbol timing detecting circuit 7. Correlator 7a is also supplied with known reference data for each of I- and Q components.

Correlator 7a calculates correlation values between the band-limited I- and Q components and I- and Q-components of the reference data. An absolute value circuit 7b squares a real part of a number thus calculated, and absolute value circuit 7c squares an imaginary part thereof.

An adder 7d obtains a sum of squares of the real part and the imaginary part, and applies the sum to a maximum value detecting portion 7e as a square of the correlation value.

FIG. 15 is a graph illustrating by way of example changes in value of the square of the correlation value obtained by adder 7d. In FIG. 15, an abscissa gives the time, and the ordinate gives the square of the correlation value.

In the graph illustrated in FIG. 15, maximum value detecting portion 7e detects the timing, at which the square of the correlation value takes the maximum value, as the timing of the symbol point, and issues the timing signal, which indicates the timing of the symbol point, for each of the I- and Q-components to symbol timing extractor 8.

Symbol timing extractor 8 includes switches 8a and 8b for supplying signal components of the I- and Q-components from band-limiting filter 6 to carrier phase and frequency offset compensator 9.

These switches 8a and 8b close when maximum value detecting portion 7e issues the timing signal indicating the timing of symbol point, and thereby obtain the signal of the I- and Q-components, which are sent from band-limiting filter 6, for providing it as the signal of the symbol point. Except for the above situations, switches 8a and 8b are open.

In this manner, symbol timing detecting circuit 7 and symbol timing extractor 8 operate to extract the signal of the symbol point from the band-limited digital receive signal, and to provide it to a downstream circuit for demodulation.

The radio reception apparatus illustrated in FIG. 13 employs sampling frequency converter 5 for the following reason. Usually, the sampling frequency of the digital signal provided from analog-to-digital converter 3 depends on an intermediate frequency, which is output from frequency converter circuit 2, and must be two or more times larger than the intermediate frequency.

For effecting the band limitation on the digital signal of such as high sampling frequency (e.g., of 80 samples per symbol) by band-limiting filter 6, therefore, the FIR filter forming band-limiting filter 6 must perform an increased amount of digital signal processing, and such signal processing takes a very long time.

Therefore, sampling frequency converter 5 is provided for converting the sampling frequency (e.g., of 80 samples per symbol) of the digital signal output of quadrature modulator 4 to a lower sampling frequency (e.g., of 8 samples per symbol).

This reduces the amount of signal processing of band-limiting filter 6 as well as the time required for the signal processing.

The above manner, in which the output signal of quadrature detector 4 is simply sampled (thinning out) by sampling frequency converter 5, suffers from a problem that downstream symbol timing detecting circuit 7 and symbol timing extractor 8 cannot accurately determine the symbol point.

FIG. 15 is a graph schematically illustrating changes in value of the foregoing square of the correlation value, which is obtained by adder 7d of symbol timing detecting circuit 7 as a result of the sampling of the signal by sampling frequency converter 5 in FIG. 13. In FIG. 15, a curve of broken line represents the value of square of the correlation value, which is considered to correspond to the digital signal of a high sampling frequency provided from quadrature detector 4, and white circles on the curve represent the values of squares of the correlation values corresponding to the symbol points sampled by sampling frequency converter 5, respectively.

In the example illustrated in FIG. 15, sampling frequency converter 5 accidentally sampled the symbol point corresponding to a peak of the digital signal. Thus, the sampling points indicated by up arrows in FIG. 15 were correctly sampled by accident.

In general, however, sampling frequency converter 5 does not particularly recognize the timing of the sampling to be performed, and performs the sampling in accordance with arbitrary timing.

FIG. 16 is a graph schematically illustrates another example of changes in value of the foregoing square of the correlation value, which is obtained by adder 7d of symbol timing detecting circuit 7 as a result of the sampling of the signal by sampling frequency converter 5 in FIG. 13. Similarly to FIG. 15, a curve of broken line in FIG. 16 represents the value of square of the correlation value, which is considered to correspond to the digital signal of a high sampling frequency provided from quadrature detector 4, and marks of "X" on the curve represent the values of squares of the correlation values corresponding to the symbol points sampled by sampling frequency converter 5. In the example illustrated in FIG. 15, sampling frequency converter 5 accidentally and correctly sampled the symbol point corresponding to the peak of the digital signal. In the example illustrated in FIG. 16, however, sampling frequency converter 5 did not correctly sample the symbol point corresponding to the peak. Thus, the sampling points indicated by up arrows in FIG. 16 are deviated from the correct sampling timing in FIG. 15.

Since the sampling timing of sampling frequency converter 5 is not particularly controlled, the sampling may be performed in accordance with deviated timing as illustrated in FIG. 16, and the results thus obtained are applied to the downstream symbol timing detecting circuit.

However, a conventional mobile communication system such as PHS generally employs the well known $\pi/4$-QPSK method as a modulation method. Therefore, even if the timing of sampled symbol points is deviated from the correct timing, a reception error or the like does not occur during signal processing.

This will now be described more specifically. According to the $\pi/4$-QPSK modulation method, as is well known, only one symbol point is arranged in each of quadrants on an I-Q coordinate plane. In this method, since only one symbol point is present in each quadrant, a symbol point is recognized as a correct point as long as the symbol point is in the correct quadrant even if there is a slight deviation in timing of the symbol point. Therefore, the reception error does not occur in subsequent signal processing.

Recent mobile communication systems such as data communication require higher quality and capacity of transmission than those in conventional voice communication. Therefore, it has been studied to apply modulation systems of more values than $\pi/4$-QPSK method already described.

As an example of such multivalued modulation method, a known 16-QAM (Quadrature Amplitude Modulation) method has been practically used in a certain kind of data communication. According to this 16-QAM method, as is well known, the I-Q coordinate plane includes four signal points, which are arranged in a grid-like fashion, in each quadrant, and thus totally includes 16 signal points, and a symbol point of the receive signal corresponds to any one of the 16 signal points.

In the case where the 16-QAM method is employed as the modulation method of PHS, therefore, if the symbol points are sampled in accordance with improper timing as illustrated in FIG. 16, it is impossible to correctly recognize the correct symbol point, which corresponds to one of the four symbol points in a grid-like fashion in a quadrant of the I-Q coordinate plane, and a symbol point neighboring to the correct symbol point is erroneously recognized instead of the correct symbol point. Thereby, a reception error occurs in subsequent signal processing.

Accordingly, an object of the invention is provide a radio reception apparatus, a symbol timing control method and a symbol timing control program, which can prevent a reception error due to a deviation of sampling timing of a symbol point even in such a case that a mobile communication system employs a multivalued modulation method for enabling fast and large-capacity transmission.

DISCLOSURE OF THE INVENTION

According to an aspect of the invention, a radio reception apparatus for receiving a signal subjected to multivalued modulation, and effecting digital processing on the received signal includes signal converting means, frequency converting means, symbol timing detecting means, signal extracting means, signal processing means and timing deviation detecting means. The signal converting means converts the received signal to a first digital signal having a first sampling frequency. The frequency converting means samples and converts the first digital signal to a second digital signal having a second sampling frequency. The symbol timing detecting means detects timing of a symbol point in the second digital signal. The signal extracting means extracts the symbol point of the detected timing from the second digital signal. The signal processing means effects predetermined digital signal processing on the extracted symbol point. The timing deviation detecting means detects a deviation of the timing of the symbol point detected by the symbol timing detecting means from timing of a correct symbol point. The frequency converting means controls the timing of sampling of the first digital signal in accordance with the deviation of the timing detected by the timing deviation detecting means such that the symbol timing detecting means detects the symbol point at the timing of the correct symbol point.

Preferably, the symbol timing detecting means determines timing when a correlation value between the second digital signal and a predetermined reference signal takes a maximum value as the timing of the symbol point in the second digital signal.

Preferably, the timing deviation detecting means calculates a magnitude and a direction of the deviation based on a relationship between magnitudes of the correlation values preceding and following the maximum value, respectively, and a magnitude of the maximum value.

Preferably, the timing deviation detecting means includes dividing means for calculating a difference between squares of the magnitudes of the correlation values preceding and following the maximum value, respectively, and dividing the calculated difference by a square of the magnitude of the maximum value; accumulating means for comparing a value obtained by the division with a predetermined threshold value, and accumulating the obtained value if the obtained value is larger than the threshold value; repeating means for repeating the division by the dividing means and the accumulation by the accumulating means a predetermined number of times; and determining means for determining a magnitude of the deviation based on a magnitude of a result of said accumulation by the accumulating means repeated the predetermined number of times, and determining a direction of the deviation based on a sign of the result of the accumulation.

Preferably, the frequency converting means corrects a reference position of the sampling of the first digital signal based on the calculated magnitude and direction of the deviation.

Preferably, the radio reception apparatus includes filter means arranged between the frequency converting means and the symbol timing detecting means for effecting band limitation on the second digital signal.

According to another aspect of the invention, a radio reception apparatus for receiving a signal subjected to multivalued modulation by a plurality of antennas, and effecting digital processing on the received signal, includes a plurality of signal converting means, a plurality of frequency converting means, symbol timing detecting means, signal extracting means, signal processing means, and timing deviation detecting means. The plurality of signal converting means convert a plurality of signals received by the plurality of antennas to a plurality of first digital signals having a first sampling frequency, respectively. The plurality of frequency converting means sample the plurality of first digital signals, and convert the first digital signals to a plurality of second digital signals having a second sampling frequency. The symbol timing detecting means detects timing of a symbol point in the second digital signal having a relatively high signal level among the plurality of second digital signals. The signal extracting means extracts the symbol point of the detected timing from the second digital signal having a relative high level among the plurality of second digital signals. The signal processing means effects predetermined digital signal processing on the extracted symbol point. The timing deviation detecting means detects a deviation of the timing of the symbol point detected by the symbol timing detecting means from the timing of the correct symbol point. Each of the plurality of frequency converting means controls the timing of sampling of the corresponding first digital signal in accordance with the deviation of the timing detected by the timing deviation detecting means such that the symbol timing detecting means detects the symbol point at the timing of the correct symbol point.

Preferably, the symbol timing detecting means determines timing when a correlation value between the second digital signal of the relatively high signal level and a predetermined reference signal takes a maximum values as the timing of the symbol point in the second digital signal.

Preferably, the timing deviation detecting means calculates a magnitude and a direction of the deviation based on a relationship between magnitudes of the correlation values preceding and following the maximum value, respectively, and a magnitude of the maximum value.

Preferably, the timing deviation detecting means includes dividing means for calculating a difference between squares of the magnitudes of the correlation values preceding and following the maximum value, respectively, and dividing the calculated difference by a square of the magnitude of the maximum value; accumulating means for comparing a value obtained by the division with a predetermined threshold value, and accumulating the obtained value if the obtained value is larger than the threshold value; repeating means for repeating the division by the dividing means and the accumulation by the accumulating means a predetermined number of times; and determining means for determining a magnitude of the deviation based on a magnitude of a result of said accumulation by the accumulating means repeated the predetermined number of times, and determining a direction of the deviation based on a sign of the result of the accumulation.

Preferably, each of the frequency converting means corrects a reference position of the sampling of the corresponding first digital signal based on the calculated magnitude and direction of the deviation.

Preferably, the radio reception apparatus includes a plurality of filter means arranged between the plurality of frequency converting means and the symbol timing detecting means for effecting band limitation on the plurality of second digital signals, respectively.

According to still another aspect of the invention, a radio reception apparatus for receiving a signal subjected to multivalued modulation by a plurality of antennas, and effecting adaptive array processing on the received signal, includes a plurality of signal converting means, a plurality of frequency converting means, symbol timing detecting means, a plurality of signal extracting means, signal processing means, timing deviation detecting means, and a reception directivity forming means. The plurality of signal converting means convert a plurality of signals received by the plurality of antennas to a plurality of first digital signals having a first sampling frequency, respectively. The plurality of frequency converting means sample the plurality of first digital signals, and convert the first digital signals to a plurality of second digital signals having a second sampling frequency. The symbol timing detecting means detects timing of a symbol point in the plurality of second digital signals. The plurality of signal extracting means extracts the symbol points from the plurality of second digital signals. The signal processing means effects predetermined digital signal processing on the extracted symbol point. The timing deviation detecting means detects a deviation of the timing of the symbol point detected by the symbol timing detecting means from the timing of the correct symbol point. The reception directivity forming means effects adaptive array processing on the plurality of second digital signals to form an array composite output having controlled reception directivity. The symbol timing detecting means calculates data relating to a correlation value between the array composite output and a predetermined reference signal, and applies the data to the timing deviation detecting means. The timing deviation detecting means effects quadratic curve approximation on a value of the maximum symbol point and values preceding and following the maximum symbol point of the data related to the correlation value applied from the symbol timing detecting means, thereby detects a deviation of the timing of the maximum symbol point from timing of a correct symbol point, and controls timing of sampling of the plurality of first digital signals by the plurality of frequency converting means and timing of symbol point extraction of the plurality of signal extracting means based on the detected deviation of the timing.

According to yet another aspect of the invention, a symbol timing control method in a radio reception apparatus receiving a signal subjected to multivalued modulation, and effecting digital processing on the received signal, includes the steps of: converting the received signal to a first digital signal having a first sampling frequency; sampling the first digital signal to convert the first digital signal to a second digital signal having a second sampling frequency; detecting timing of a symbol point in the second digital signal; extracting the symbol point of the detected timing from the second digital signal; effecting predetermined digital signal processing on the extracted symbol point; and detecting a deviation of the detected timing of the symbol point from the timing of a correct symbol point. The step of sampling the first digital signal controls the timing of the sampling of the first digital signal in accordance with the detected deviation of the timing such that the symbol point is detected at the timing of the correct symbol point.

Preferably, the step of detecting the timing of the symbol point is performed to determine timing when a correlation value between the second digital signal and a predetermined reference signal takes a maximum as the timing of the symbol point in the second digital signal.

Preferably, the step of detecting the deviation of the timing is performed to calculate a magnitude and a direction of the deviation based on a relationship between magnitudes of the correlation values preceding and following the maximum value, respectively, and a magnitude of the maximum value.

Preferably, the step of detecting the deviation of the timing includes the steps of calculating a difference between squares of the magnitudes of the correlation values preceding and following the maximum value, respectively, and dividing the calculated difference by a square of the magnitude of the maximum value; comparing a value obtained by the division with a predetermined threshold value, and accumulating the obtained value if the obtained value is larger than the threshold value; repeating the division and the accumulation a predetermined number of times; and determining a magnitude of the deviation based on a magnitude of a result of said accumulation repeated the predetermined number of times, and determining a direction of the deviation based on a sign of the result of the accumulation.

Preferably, the step of sampling the first digital signal is performed to correct a reference position of the sampling of the first digital signal based on the calculated magnitude and direction of the deviation.

Preferably, the symbol timing control method further includes a step of effecting band limitation on the second digital-signal.

According to further another aspect of the invention, a symbol timing control method in a radio reception apparatus receiving a signal subjected to multivalued modulation by a plurality of antennas, and effecting adaptive array processing on the received signal, includes the steps of: converting a plurality of signals received by the plurality of antennas to a plurality of first digital signals having a first sampling frequency, respectively; sampling the plurality of first digital signals to convert the first digital signals to a plurality of second digital signals having a second sampling frequency; detecting timing of a symbol point in the plurality of second digital signals; extracting the symbol points from the plurality of second digital signals; effecting predetermined digital signal processing on the extracted symbol point; detecting a deviation of the timing of the detected symbol point from the timing of the correct symbol point; and effecting adaptive array processing on the plurality of second digital signals to form an array composite output having controlled reception directivity. The step of detecting the timing of the symbol point includes a step of calculating data relating to a correlation value between the array composite output and a predetermined reference signal. The step of detecting the timing deviation includes a step of effecting quadratic curve approximation on a value of the maximum symbol point and values preceding and following the maximum symbol point of the data related to the correlation value, and thereby detecting a deviation of the timing of the maximum symbol point from timing of a correct symbol point, and a step of controlling timing of sampling of the plurality of first digital signals and timing of the symbol point extraction based on the detected deviation of the timing.

According to further aspect of the invention, a symbol timing control program in a radio reception apparatus receiving a signal subjected to multivalued modulation, and effecting digital processing on the received signal, causes a computer to execute the steps of: converting the received signal to a first digital signal having a first sampling frequency; sampling the first digital signal to convert the first digital signal to a second digital signal having a second sampling frequency; detecting timing of a symbol point in the second digital signal; extracting the symbol point of the detected timing from the second digital signal; effecting predetermined digital signal processing on the extracted symbol point; and detecting a deviation of the detected timing of the symbol point from the timing of a correct symbol point. The step of sampling the first digital signal controls the timing of the sampling of the first digital signal in accordance with the detected deviation of the timing such that the symbol point is detected at the timing of the correct symbol point.

Preferably, the step of detecting the timing of the symbol point is performed to determine timing when a correlation value between the second digital signal and a predetermined reference signal takes a maximum as the timing of the symbol point in the second digital signal.

Preferably, the step of detecting the deviation of the timing is performed to calculate a magnitude and a direction of the deviation based on a relationship between magnitudes of the correlation values preceding and following the maximum value, respectively, and a magnitude of the maximum value.

Preferably, the step of detecting the deviation of the timing includes the steps of calculating a difference between squares of the magnitudes of the correlation values preceding and following the maximum value, respectively, and dividing the calculated difference by a square of the magnitude of the maximum value; comparing a value obtained by the division with a predetermined threshold value, and accumulating the obtained value if the obtained value is larger than the threshold value; repeating the. division and the accumulation a predetermined number of times; and determining a magnitude of the deviation based on a magnitude of a result of said accumulation repeated the predetermined number of times, and determining a direction of the deviation based on a sign of the result of the accumulation.

Preferably, the step of sampling the first digital signal is performed to correct a reference position of the sampling of the first digital signal based on the calculated magnitude and direction of the deviation.

Preferably, the symbol timing control method further causes the computer to execute the step of effecting band limitation on the second digital signal.

According to further another aspect of the invention, a symbol timing control program in a radio reception apparatus receiving a signal subjected to multivalued. modulation by a plurality of antennas, and effecting adaptive array processing on the received signal, causes a computer to execute the steps of: converting a plurality of signals received by the plurality of antennas to a plurality of first digital signals having a first sampling frequency, respectively; sampling the plurality of first digital signals to convert the first digital signals to a plurality of second digital signals having a second sampling frequency; detecting timing of a symbol point in the plurality of second digital signals; extracting the symbol points from the plurality of second digital signals; effecting predetermined digital signal processing on the extracted symbol point; detecting a deviation of the timing of the detected symbol point from the timing of the correct symbol point; and effecting adaptive array processing on the plurality of second digital signals to form an array composite output having controlled reception directivity. The step of detecting the timing of the symbol point includes a step of calculating data relating to a correlation value between the array composite output and a predetermined reference signal. The step of detecting the timing deviation includes a step of effecting quadratic curve approximation on a value of the maximum symbol point and values preceding and following the maximum symbol point of the data related to the correlation value, and thereby detecting a deviation of the timing of the maximum symbol point from timing of a correct symbol point, and a step of controlling timing of sampling of the plurality of first digital signals and timing of the symbol point extraction based on the detected deviation of the timing.

Even in the mobile communication system employing the multivalued modulation system, the deviation of the sampling timing of the symbol point in the frequency converting means is corrected to provide the correct timing, and therefore the invention can prevent occurrence of a reception error due to the deviation of the sampling timing.

BRIEF DESCRIPTION OF THE DRAWINGS

FIG. 8 is a function block diagram illustrating a structure the radio reception apparatus according to a second embodiment of the invention.

BEST MODES FOR CARRYING OUT THE INVENTION

Embodiments of the invention will now be described with reference to the drawings. In the following description, the same or corresponding portions bear the same reference numbers, and therefore description thereof is not repeated.

[First Embodiment]

Figure 1:
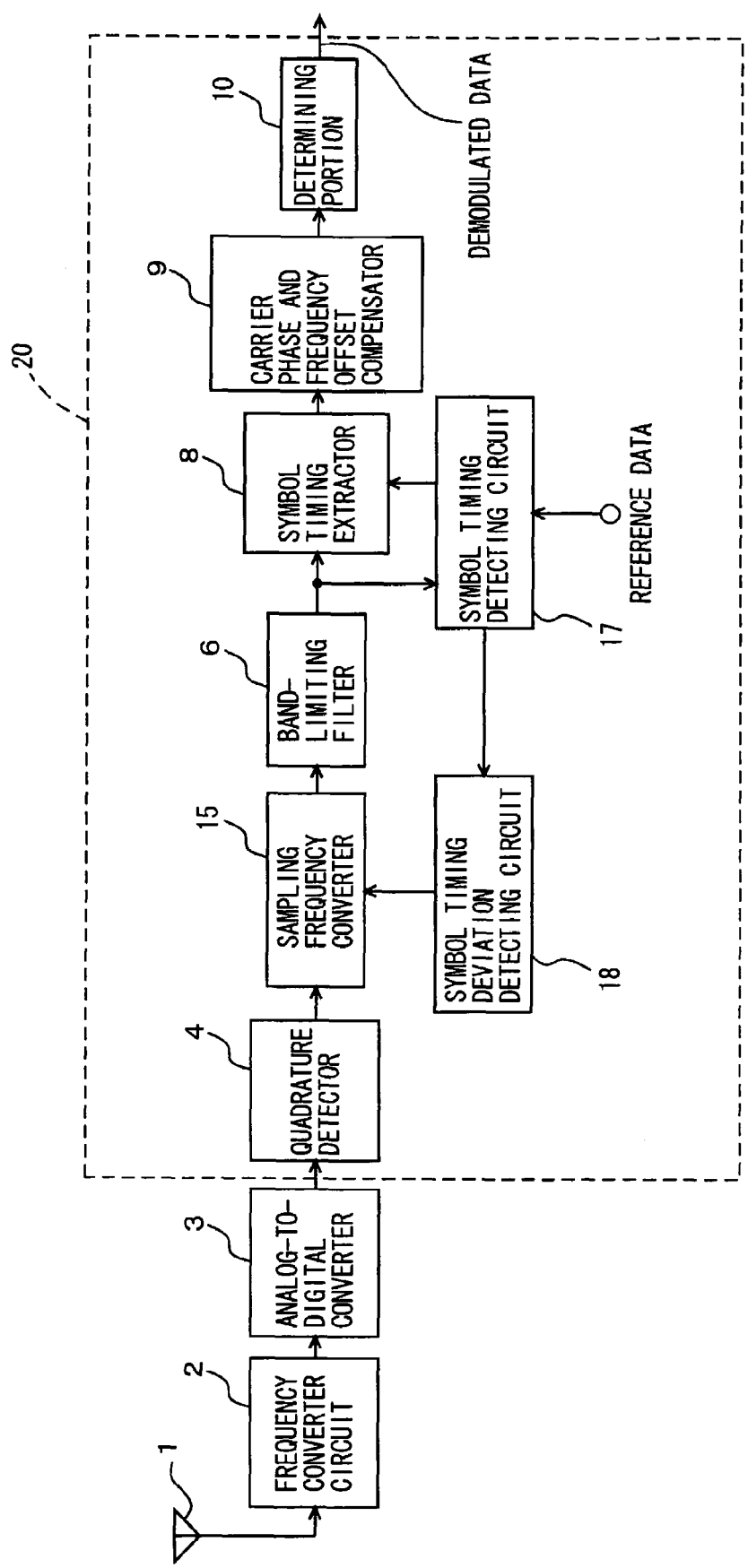
FIG. 1 is a function block diagram illustrating a structure of a radio reception apparatus according to a first embodiment of the invention.

FIG. 1 is a function block diagram illustrating a structure of a radio reception apparatus according to a first embodiment of the invention, which is applied to a base station of a mobile communication system such as PHS. Each of embodiments, which will be described below, employs well known 16-QAM as a multivalued modulation method. Therefore, determining portion 10 in a last stage determines symbol points according to the 16-QAM.

Figure 13:
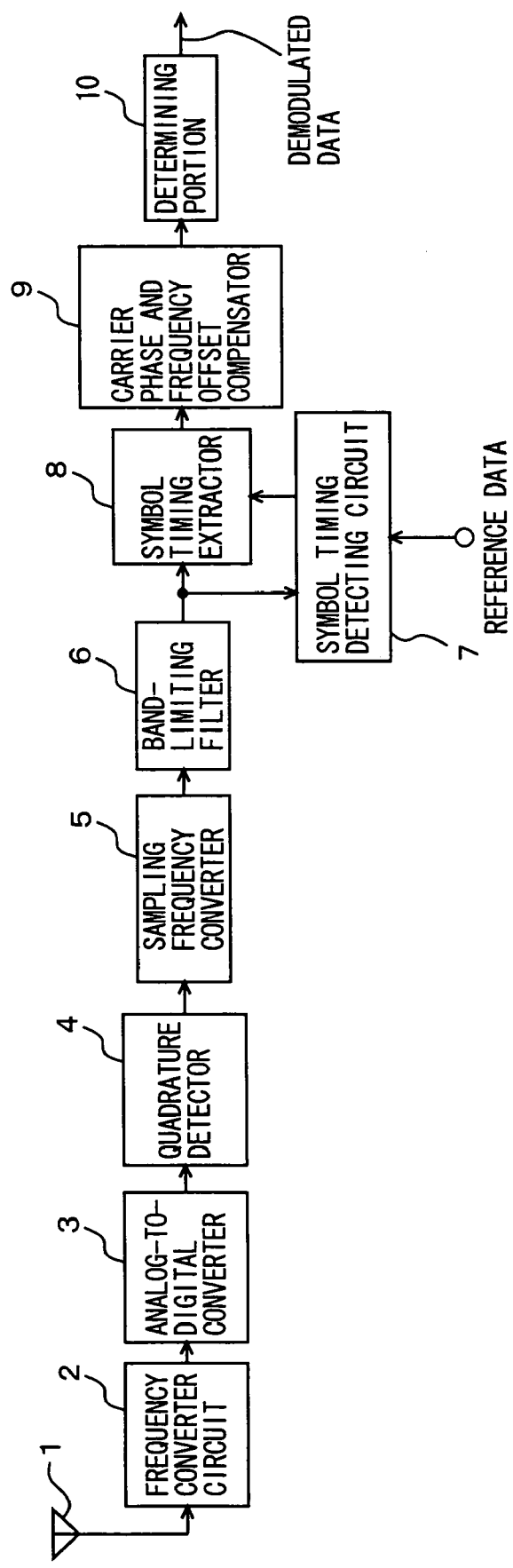
FIG. 13 is a function block diagram illustrating a structure of a conventional radio reception apparatus.

The radio reception apparatus illustrated in FIG. 1 is the same as the conventional radio reception apparatus illustrated in FIG. 13 except for the following portions. A symbol timing detecting circuit 17 basically has the same structure as symbol timing detecting circuit 7 illustrated in FIG. 14, and is configured to apply data of a square of a correlation value, which is provided from adder 7*d* in FIG. 14, not only to maximum value detecting portion 7*e* but also to an external portion. Maximum value detecting portion 7*e* externally supplies a signal representing timing when the square of the correlation value takes the maximum value.

A symbol timing deviation detecting circuit 18 receives the data of square of the correlation value and the maximum value timing data thus provided from symbol timing detecting circuit 17. Based on the data of square of the correlation value and the maximum value timing data, symbol timing deviation detecting circuit 18 issues a timing signal, which controls timing of sampling in a sampling frequency converter 15, to sampling frequency converter 15.

Figure 2A:
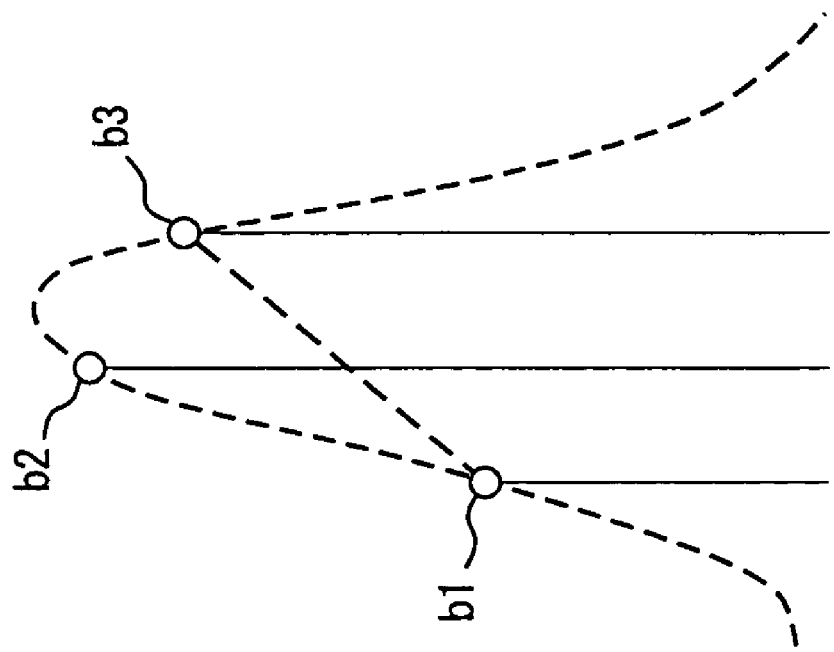
FIGS. 2A and 2B are waveform diagrams illustrating a principle of the first embodiment of the invention.
Figure 2B:
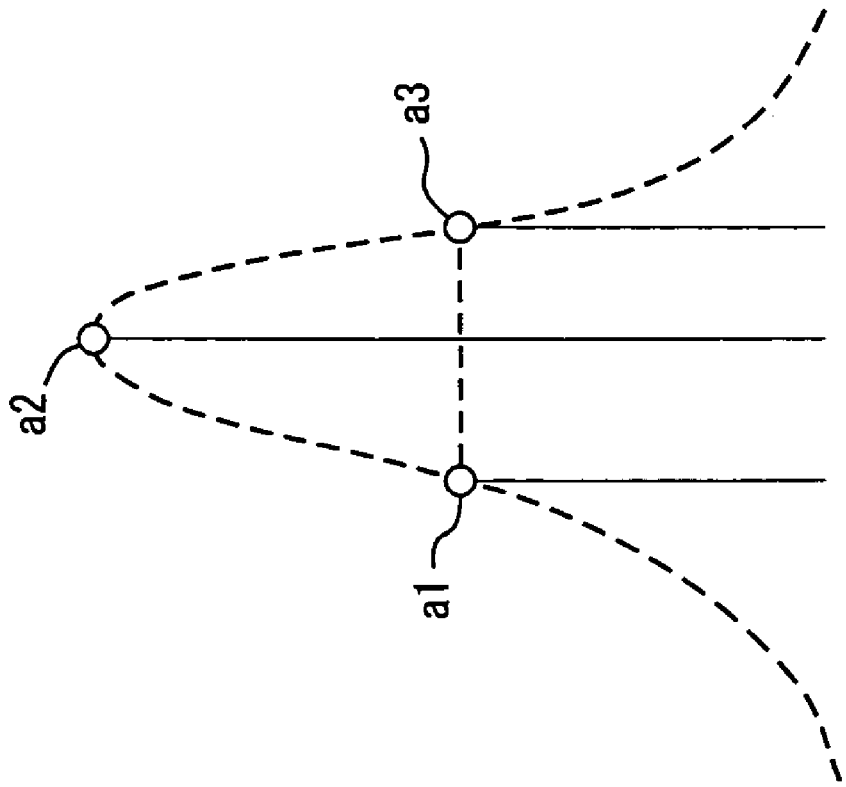

FIGS. 2A and 2B are waveform diagrams schematically illustrate a principle, on which the symbol timing deviation detecting circuit of FIG. 1 corrects the deviation of timing of the sampling in sampling frequency converter 15.

Figure 15:
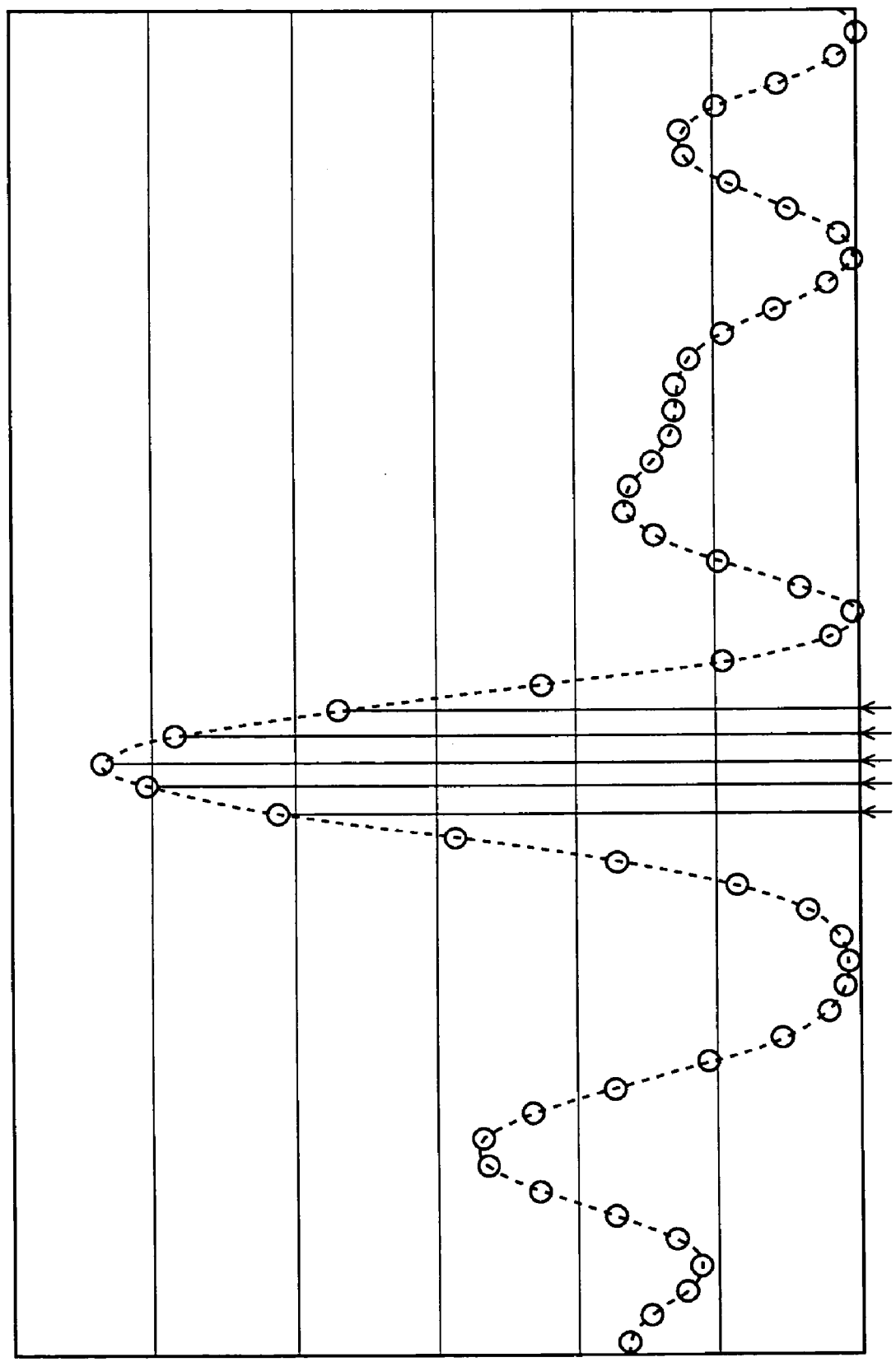
FIG. 15 illustrates changes in square of a correlation value.
Figure 16:
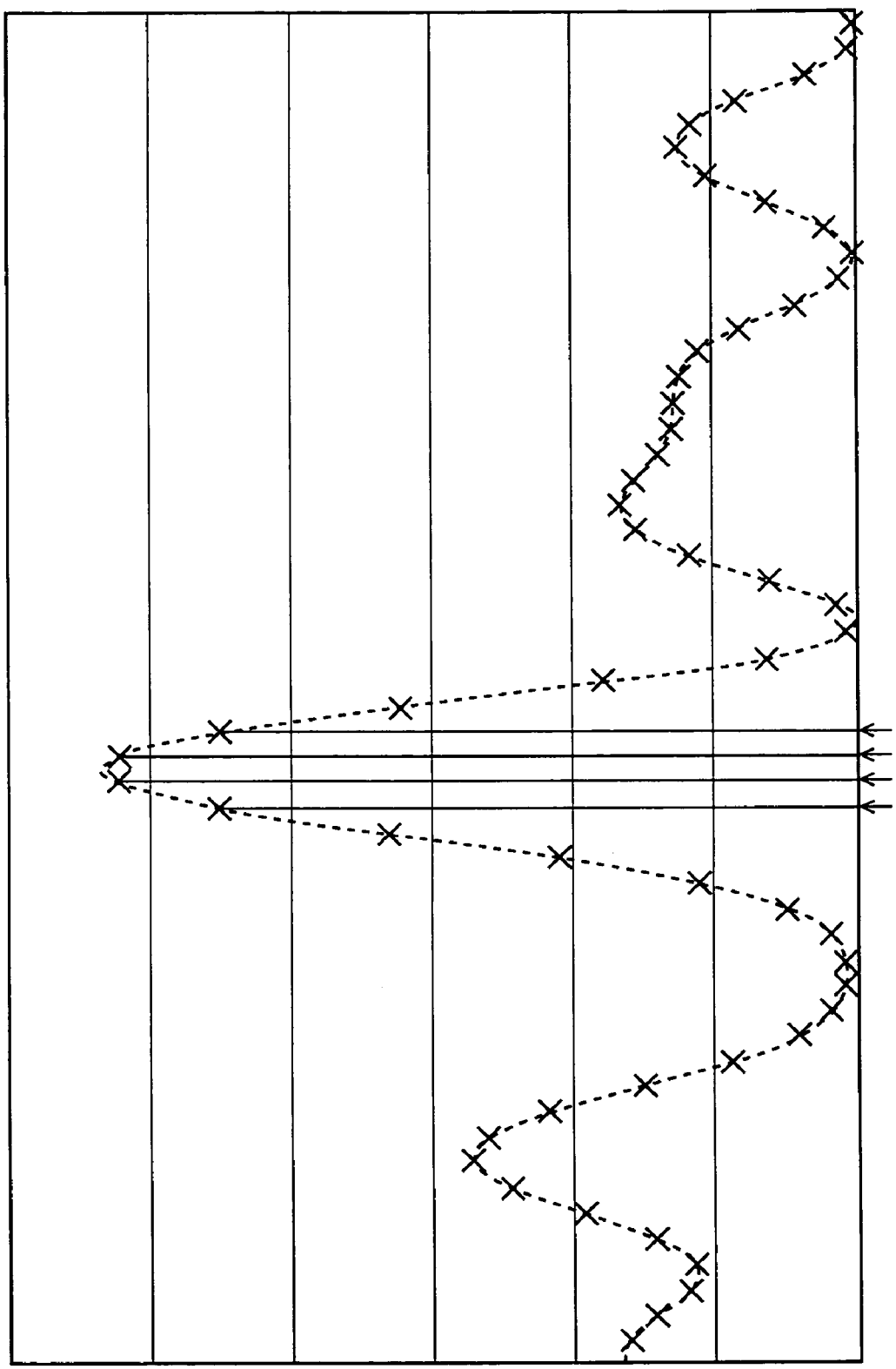
FIG. 16 illustrates another form of changes in square of the correlation value.

FIGS. 2A and 2B are graphs illustrating, on an enlarged scale, peak portions of graphs shown in FIGS. 15 and 16, respectively, representing the squares of the correlation values supplied from symbol timing detecting circuit 17. In these graphs, white circles represent signal points of squares of the respective correlation values.

FIG. 2A illustrates a peak portion of the square of correlation value in the case where sampling frequency converter 15 performs the sampling at the correct timing as illustrated in FIG. 15. In FIG. 2A, a point a2 representing the maximum value is present on a peak of the square of the correlation value, and therefore, points a1 and a3, which represent squares of the correlation values at the points preceding and following point a1, respectively, have substantially the same magnitude.

In contrast to the above, FIG. 2B illustrates a peak portion of the square of the correlation value in the case where sampling frequency converter 15 performs the sampling at the deviated timing as illustrated in FIG. 16. In FIG. 2B, a point b2 representing the maximum value is not present on a peak of the square of the correlation value, and therefore, points b1 and b3 representing squares of the correlation values at the points preceding and following point b2 have different magnitudes, respectively.

In view of the above, magnitudes of differences between the two squares (a1 and a3, and b1 and b3) preceding and following the maximum value (a2 and b2) of the square of the correlation value as well as directions of changes thereof may be determined so as to determine a magnitude and a direction of the deviation of the maximum value of the correlation value from the position of the peak, and thus to determine a magnitude and a direction of the deviation of the timing of sampling by sampling frequency converter 15 from original or correct timing.

The timing of sampling of sampling frequency converter 15 is corrected corresponding to the detected magnitude and direction of the deviation, whereby the symbol point can be extracted at the correct timing.

In the structure of the radio reception apparatus illustrated in FIG. 1, functions of portions following quadrature detector 4 can be achieved via software by a digital signal processing portion 20 such as a digital Signal Processor (DSP). In practice, the operations of the radio reception apparatus according to the first embodiment of the invention are executed by software in accordance with flowcharts of FIGS. 3, 4 and 6. DSP 20 reads a program provided with steps illustrated in these flowcharts from a memory (not shown), and executes it. This program can be externally installed.

Figure 3:
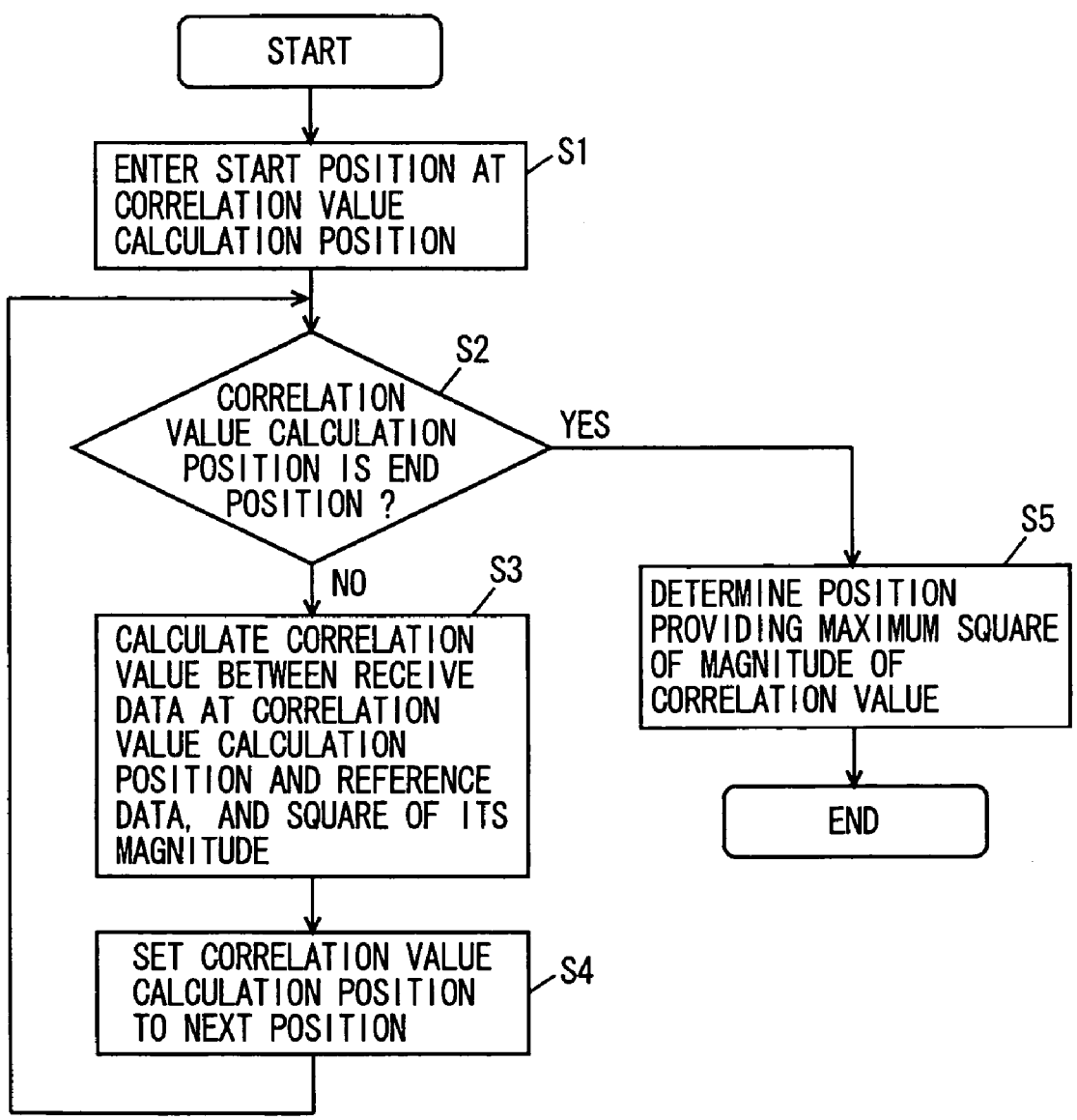
FIG. 3 is a flowchart illustrating an operation of the radio reception apparatus according to the first embodiment of the invention.

FIG. 3 is a flowchart representing an operation of detecting the data of square of the magnitude of correlation value in symbol timing detecting circuit 17 in FIG. 1 as well as the timing of the maximum value thereof.

Referring to FIG. 3, a start position is entered at a correlation value calculation position in a step S1. In a step S2, it is determined whether the correlation value calculation position is an end position or not.

If it is not the end position, the operation moves to a step S3, and complex multiplication and complex addition are effected on a digital receive signal at the correlation value calculation position and known reference data so that the correlation value and the square of its magnitude are obtained.

In a next step S4, the correlation value calculation position changes to a next position.

Until it is determined in step S2 that the correlation value calculation position is the end position, processing in steps S3 and S4 is repeated. When it is determined that the correlation value calculation position is the end position, a timing position, at which the square of magnitude of the correlation value takes a maximum value, is determined in a step S5.

Figure 4:
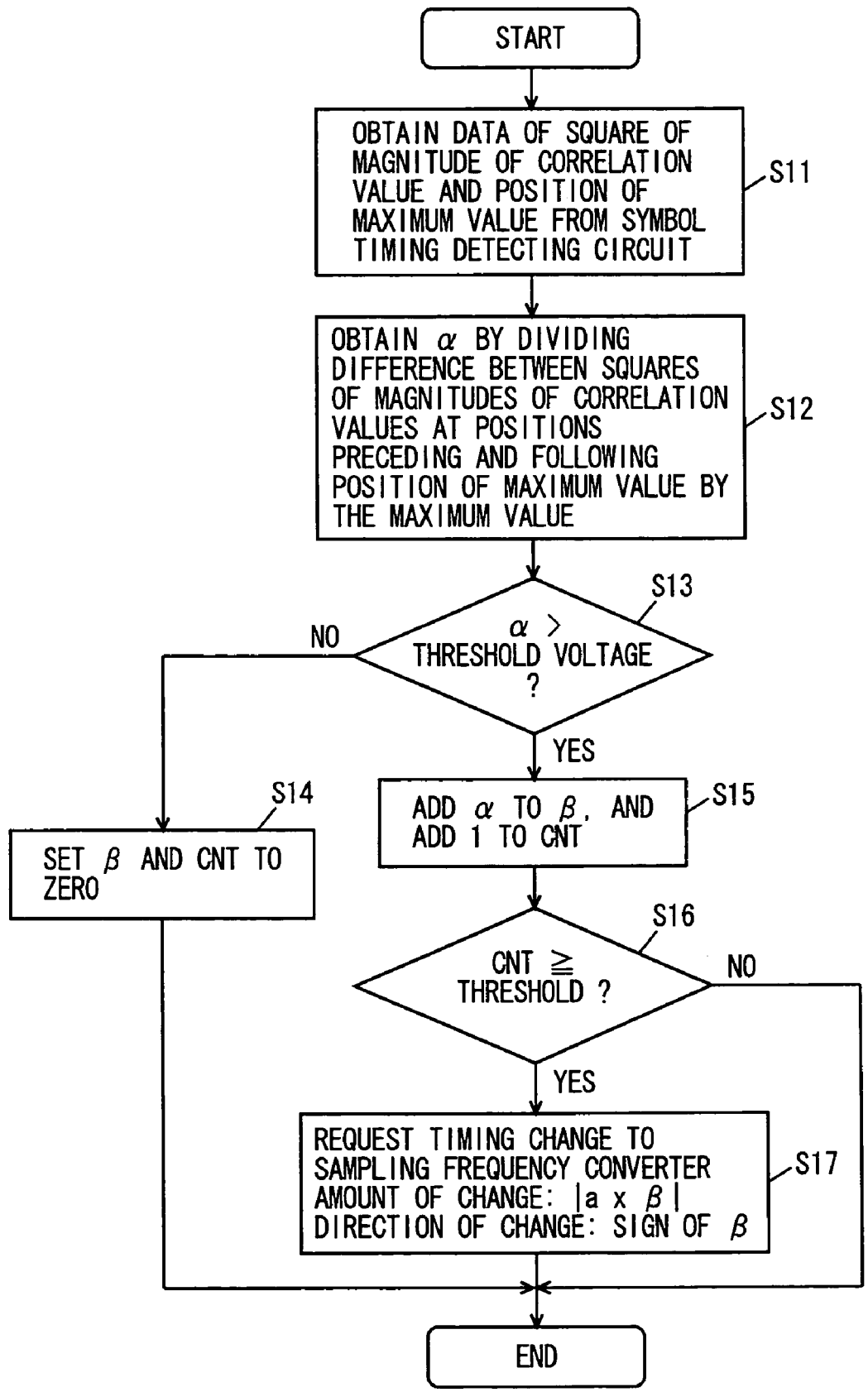
FIG. 4 is a flowchart illustrating an operation of the radio reception apparatus according to the first embodiment of the invention.

FIG. 4 is a flowchart illustrating an operation of forming sampling timing change data in symbol timing deviation detecting circuit 18 illustrated in FIG. 1.

First, the data of the square of magnitude of the correlation value and the data representing the timing position of the maximum value thereof are obtained in a step S11.

Then, an operation is performed in a step S12 to obtain a difference between the magnitudes of squares the correlation values preceding and following the maximum value, and to divide the obtained difference by the maximum value of the magnitude of square of the correlation value. A result of this division will be handled as $\alpha$.

In a step S13, it is determined whether $\alpha$ is larger than a predetermined threshold value or not. If not, $\beta$, which is an accumulation value of $\alpha$, is set to zero, and a value of counter CNT obtained by counting the number of times of processing is set to zero.

If it is determined in step S13 that $\alpha$ is larger than the threshold value, the currently calculated $\alpha$ is added to $\beta$, which is the accumulation value of $\alpha$, and counter CNT is incremented by one.

In a step S16, it is determined whether CNT is smaller than the predetermined threshold value or not. If it is smaller that the predetermined threshold value, the processing ends. When next data is calculated by the processing in FIG. 3, the data is obtained in step S11, and processing from step S12 to step S16 is repeated while incrementing count CNT by one.

When it is determined in a step S16 that CNT reaches the threshold value or more after the processing is repeated a certain number of times, the operation moves to a step S17.

In step S17, $\beta$, which is the result of accumulation of $\alpha$ obtained by the processing already performed, is multiplied by a predetermined coefficient a, and an absolute value of $(a \times \beta)$ thus obtained is handled as an amount of change in sampling timing, and thus an amount of correction for the sampling timing in sampling frequency converter 15.

A sign of $\beta$ is handled as a direction of the change in sampling timing, and thus a direction of the correction of the sampling timing in sampling frequency converter 15.

Figure 5:
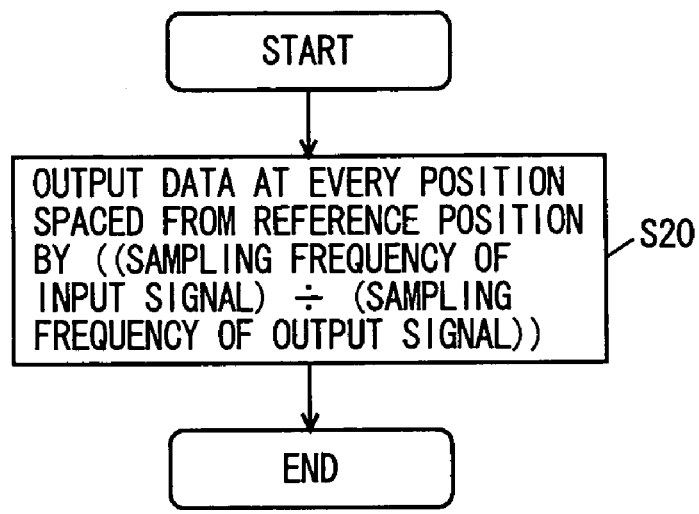
FIG. 5 is a flowchart illustrating an operation of a conventional radio reception apparatus.

FIG. 5 is a flowchart representing, for the purpose of comparison, an operation of a conventional sampling frequency converter 5 in FIG. 13. In conventional sampling frequency converter 5, an input signal is sampled and output at the timing spaced by ((sampling frequency of input signal)÷(sampling frequency of output signal)) from an arbitrary reference timing position in a step S20.

Figure 6:
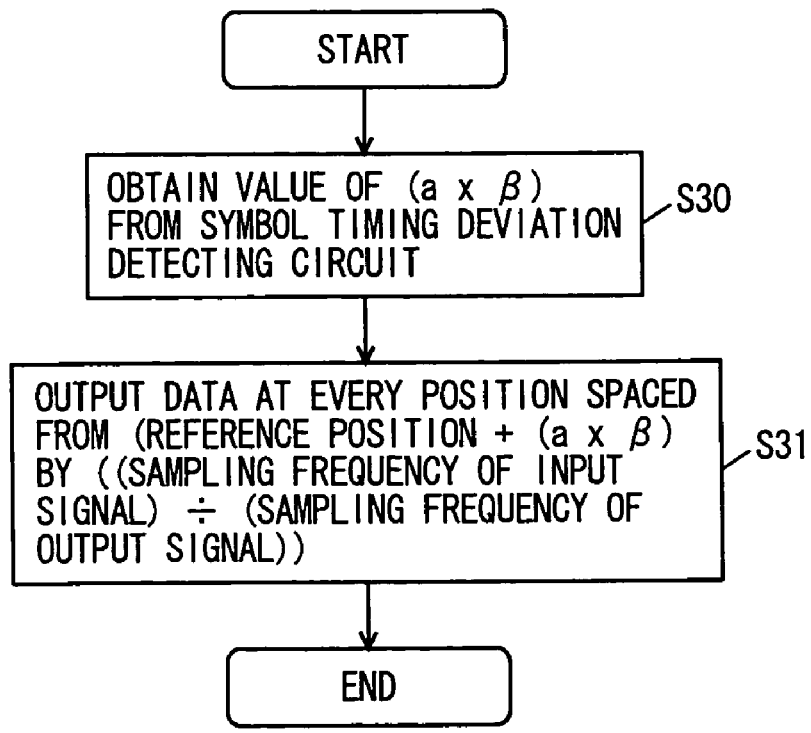
FIG. 6 is a flowchart illustrating an operation of the radio reception apparatus according to the first embodiment of the invention.

Meanwhile, FIG. 6 is a flowchart illustrating an operation of changing the sampling timing in sampling frequency converter 15 in FIG. 1.

Referring to FIG. 6, data of $(a \times \beta)$ calculated by the processing in FIG. 4 is obtained in a step S30.

In a step S31, $(a \times \beta)$ is added to the arbitrary reference timing position. Thereby, the reference timing for starting the sampling in sampling frequency converter 15 can be corrected in connection with the magnitude and direction of the deviation of the sampling timing, which are detected by symbol timing deviation detecting circuit 18.

Consequently, symbol timing extractor 8 extracts the symbol point at the correct timing, and following determining portion 10 correctly determines the symbol point by the 16-QAM method.

Figure 7:
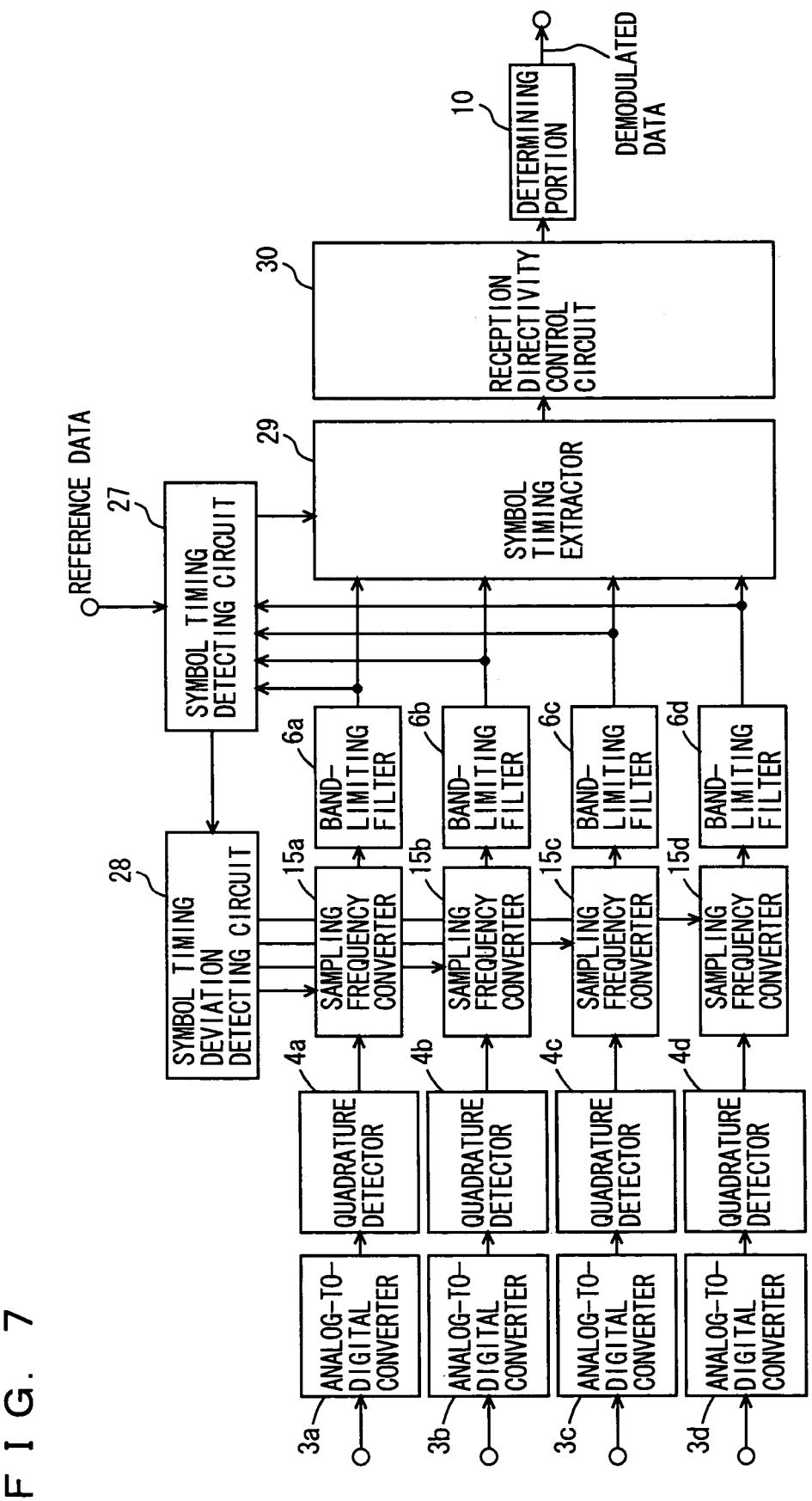
FIG. 7 is a function block diagram illustrating an example of application of the radio reception apparatus according to the first embodiment of the invention to a PHS base station.

FIG. 7 is a function block diagram illustrating the radio reception apparatus according to the foregoing embodiment, which is applied to the base station of PHS receiving signals by a plurality of antennas.

Referring to FIG. 7, the analog receive signals are applied from four antennas (not shown) via corresponding four frequency converter circuits (not shown), and are converted into digital signals by corresponding analog-to-digital converters 3a–3d, respectively.

Quadrature detectors 4a–4d receive these digital receive signals, and effect the quadrature detection on them.

Quadrature detectors 4a–4d provide their outputs to sampling frequency converters 15a–15d, respectively, which intermittently samples the digital receive signals to convert the sampling frequencies of the digital receive signals to lower sampling frequencies, respectively.

Digital signal outputs of sampling frequency converters 15a–15d are applied to band-limiting filters 6a–6d for band limiting.

Band-limiting filters 6a–6d provide their outputs to a symbol timing detecting circuit 27, and also provide them to a symbol timing extractor 29. Symbol timing detecting circuit 27 selects the signal of the maximum receive level from the digital signal outputs of band-limiting filters 6a–6d, detects the timing, at which a symbol point is present, among the selected digital signal outputs based on the selected digital signal and the known reference data, and applies a timing signal representing the detected timing to symbol timing extractor 29.

Based on the timing signal provided from symbol timing detecting circuit 27, symbol timing extractor 29 selects the signal of the maximum receive level among the digital signal outputs of band-limiting filters 6a–6d, and extracts the data of the symbol point of the selected digital signal.

Data of the symbol point extracted by symbol timing extractor 29 is applied to a reception directivity control circuit 30, which performs well known adaptive array processing to control the directivity of the receive signal.

Reception directivity control circuit 30 provides its output to determining portion 10, which determines the symbol point on the I-Q coordinate plate based on the well known 16-QAM method, and provides the result as demodulated data.

Symbol timing detecting circuit 27 operates in the same manner as symbol timing detecting circuit 17 illustrated in FIG. 1 except for that the signal of the maximum receive level is selected from the four receive signals. A symbol timing deviation detecting circuit 28 commonly applies the detected signal for timing correction to four sampling frequency converters 15a–15d.

As described above, the invention can be applied to the base station (e.g., adaptive array base station) provided with multiple radio reception apparatuses, and can achieve similar effects.

[Second Embodiment]

Figure 8:
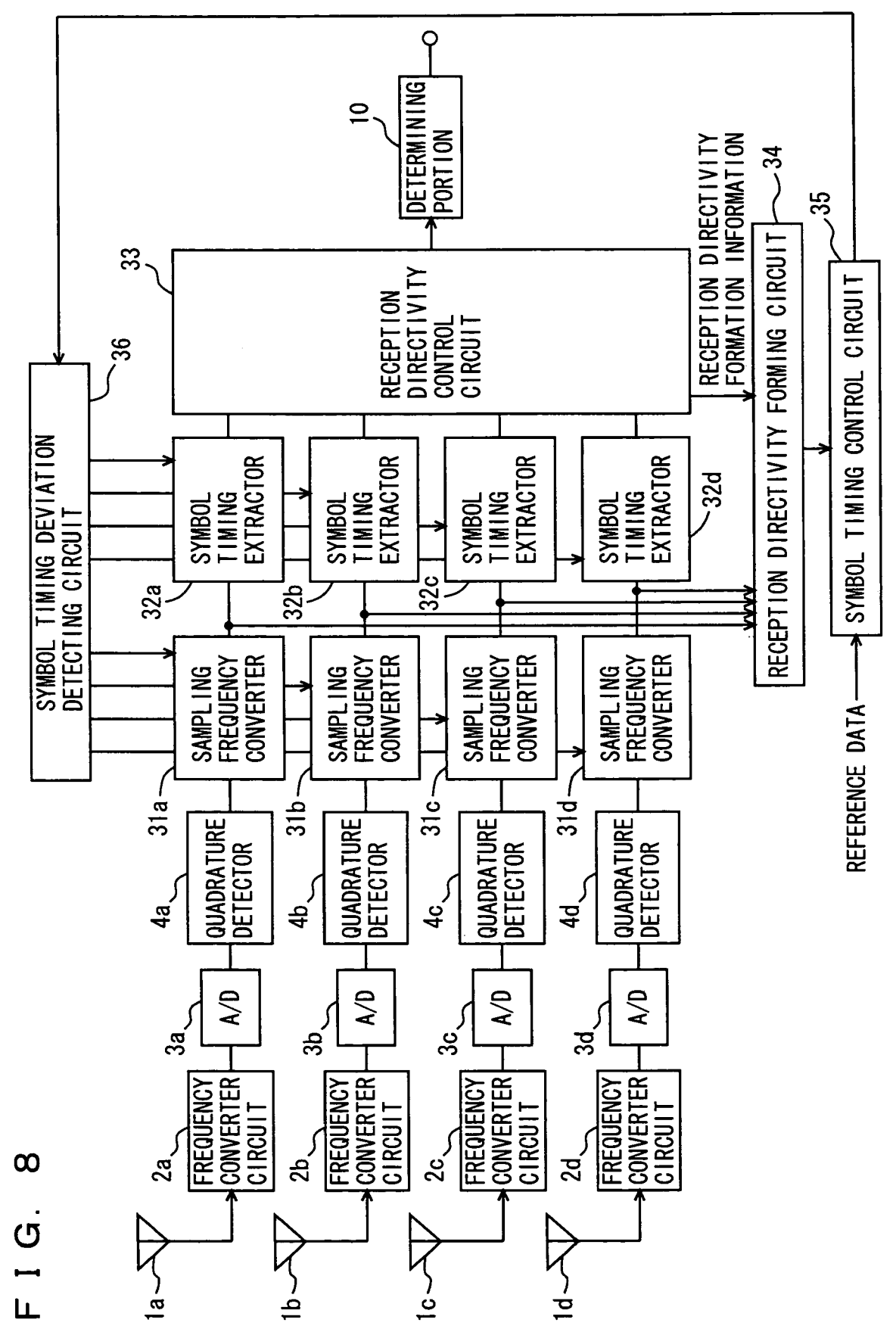

FIG. 8 is a function block diagram illustrating a structure of a radio reception apparatus according to a second embodiment of the invention.

The second embodiment of the invention illustrated in FIG. 8 is an improvement of the radio reception apparatus of the first embodiment.

Thus, the radio reception apparatus according to the first embodiment illustrated in FIGS. 1 and 7 uses the output of the band-limiting filter as it is, and thereby performs the detection of the symbol timing, and thus the detection of the deviation of the symbol timing. The radio reception apparatus according to the second embodiment described below is an adaptive array radio reception apparatus (e.g., adaptive array base station in the PHS) capable of adaptive array reception with a plurality of antennas, and particularly uses an array composite output, which is calculated from the result of the adaptive array processing of the receive signal, for detecting the symbol timing and the deviation of the symbol timing.

Further, the second embodiment employs a method by quadratic curve approximation, which will be described below, instead of the method of detecting the deviation of the symbol timing in the first embodiment illustrated in FIGS. 2A–4.

Improvements will now be described.

Referring to FIG. 8, analog receive signals are applied from four antennas 1a–1d forming an array antenna through four corresponding frequency converter circuits 2a–2d to corresponding analog-to-digital converters 3a–3d, respectively, and are converted thereby to digital signals.

These digital receive signals are applied to corresponding quadrature detectors 4a–4d, which perform the quadrature detection on them, respectively.

Quadrature detectors 4a–4d apply their outputs to sampling frequency converters 31a–31d, respectively, which intermittently sample the received digital signals to convert the sampling frequency of the digital receive signals to a lower sampling frequency.

The digital signal outputs of sampling frequency converters 31a–31d are applied to corresponding symbol timing extractors 32a–32d through band-limiting filters (not shown) for band limitation, respectively, and are also applied to a reception directivity forming circuit 34.

Symbol timing extractors 32a–32d each extracts the data of the symbol point of the input digital signal, as will be described later.

The data of the symbol point extracted by symbol timing extractors 32a–32d are applied to a reception directivity control circuit 33, and is subjected to the known adaptive array processing to control the directivity of the receive signal.

According to the adaptive array processing, a reception weight vector formed of reception coefficients (weights) corresponding to the respective antennas are calculated based on the signals sent from terminals and received by the array antenna formed of a plurality of antennas of the base station, and application control is performed according to the vector thus calculated to extract a signal sent from a specific terminal.

In the adaptive array base station employing the adaptive array processing described above, a reception weight vector calculator for calculating such reception weight vector is provided for each of symbols of the receive signal. The reception weight vector calculator executes processing over a section (weight estimation section) of a known reference signal provided at a leading portion of each frame of the receive signal such that the reception weight vector may converge to reduce a square of a difference between the known reference signal and a sum (array forming output signal) of complex multiplication of the receive signal and the calculated reception weight vector, and thus, the reception weight vector calculator executes the adaptive array processing of converging the reception directivity related to the specific terminal.

According to the adaptive array processing, the convergence of the reception weight vectors is adaptively performed in accordance with the time and variations in transmission path characteristics of signal radio waves so that interference components and noises are removed from the received signals, and the receive signal sent from the specific terminal user is extracted.

The reception weight vector calculator uses adaptive array algorithm such as RLS (Recursive Least Squares) algorithm, LMS (Least Mean Square) algorithm or SMI (Sample Matrix Inversion) algorithm, which learns weights by MMSE (Minimum Mean Square Error) based on the square of the error between the array composite output signal and the reference signal. Such RLS algorithm, LMS algorithm and SMI algorithm are well known in the field of the adaptive array processing.

The radio reception apparatus employing the adaptive array processing is disclosed, e.g., in "An Adaptive Array Antenna PHS Base Station", Toshinori Iinuma et al., Sanyo Technical Review, Sanyo Electric Co., Ltd., May 1, 2000, Vol. 32, No. 1, pp. 80–88. Therefore, detailed description of the adaptive array processing is not repeated.

Reception directivity control circuit 33 provides its output to determining portion 10, which determines the symbol points on the I-Q coordinate plane based on the known 16-QAM method, and provides a result as demodulated data.

The reception directivity formation information, i.e., the reception weight vector, which is calculated by reception directivity control circuit 33 as described above, is applied to reception directivity forming circuit 34. Reception directivity forming circuit 34 receives digital signals from sampling frequency converters 31a–31d.

Reception directivity forming circuit 34 forms an array composite output, which is a complex multiplication sum of the input digital signals provided from sampling frequency converters 31a–31d and the reception weight vector provided from reception directivity control circuit 33, and provides it to a symbol timing detecting circuit 35.

Figure 14:
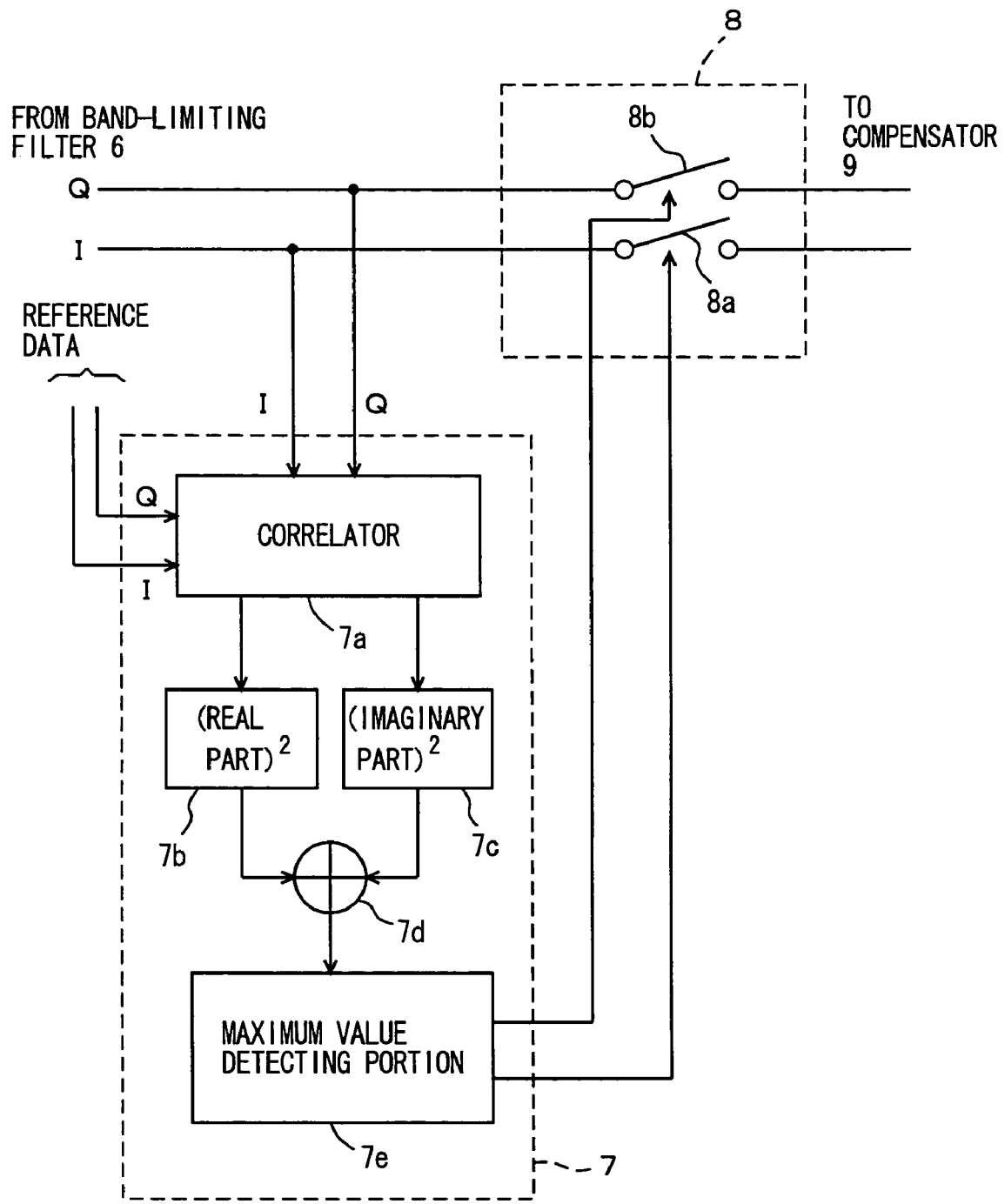
FIG. 14 is a function block diagram illustrating structures of a symbol timing detecting circuit 7 and a symbol timing extractor 8 illustrated in FIG. 13.

Symbol timing detecting circuit 35 basically has the same structure as symbol timing detecting circuit 7 illustrated in FIG. 14 (and symbol timing detecting circuit 17 of the first embodiment) except that symbol timing detecting circuit 7 in FIG. 14 obtains the square data of the correlation value between the input, which is the output of the band-limiting filter, and the reference data, but symbol timing detecting circuit 35 calculates the square data of the correlation value between the array composite output and the reference data, and applies it to a symbol timing deviation detecting circuit 36.

Figure 9:
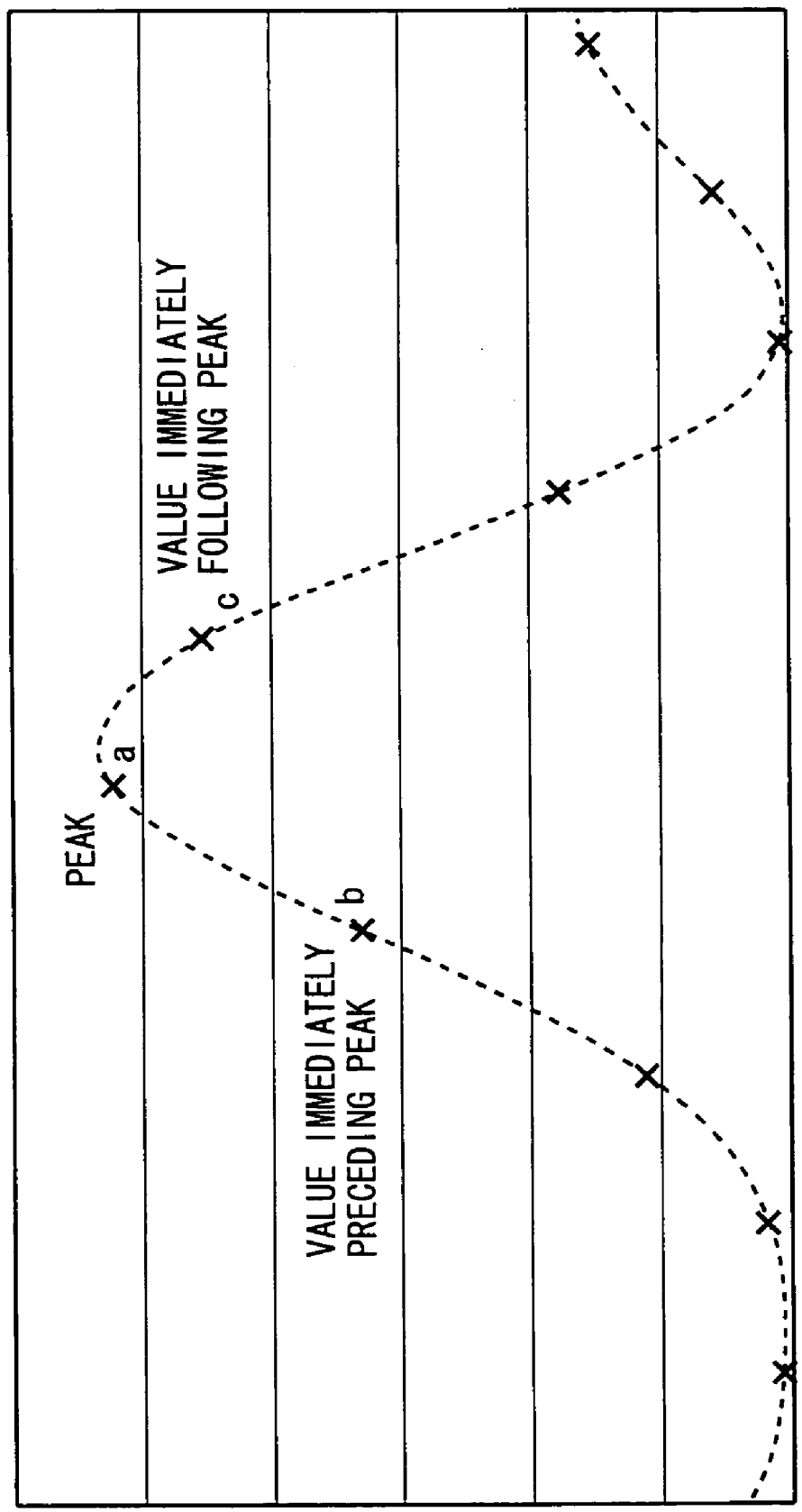
FIG. 9 is a waveform diagram illustrating a principle of the second embodiment of the invention.

FIG. 9 illustrates a waveform of the square data of the correlation value, which is obtained between the array composite output and the reference data, and is applied from symbol timing detecting circuit 35 to symbol timing deviation detecting circuit 36. Referring to this waveform, description will now be given on the method of calculating the symbol timing deviation by symbol timing deviation detecting circuit 36 of the second embodiment.

In FIG. 9, a curve of broken line represents the square data of the correlation value corresponding to the digital signal of a high sampling frequency, which is not yet lowered by sampling frequency converters 31a–31d. "X" marks on the curve represent the square data of the correlation values corresponding to the symbol points sampled by sampling frequency converters 31a–31d.

Among the square data indicated by the "X" marks in to FIG. 9, it is assumed that "a" indicates a peak value, and "b" and "c" indicate values immediately preceding and following the peak, respectively. It is assumed that the sampling points are spaced from each other by "Δt".

By effecting the quadratic curve approximation on these three points, a width of deviation of the symbol point from the original peak point is calculated by the following formula:

$$-\{(c-b)/(c+b-2a)\} \times (\Delta t/2)$$

The timing is deviated by the deviation width expressed by this formula from the symbol timing of peak value a in FIG. 9, whereby the correct symbol timing corresponding to the original peak can be obtained. For eliminating an influence by variations in data, averaging processing is effected on the estimated symbol timing value thus obtained, and thereby the symbol timing is finally determined according to the second embodiment. This can improve the accuracy of estimation of the symbol timing.

Returning to FIG. 8, symbol timing deviation detecting circuit 36 adjusts or controls the timing of sampling of sampling frequency converters 31a–31d based on the correct symbol timing thus calculated. Symbol timing deviation detecting circuit 36 controls the timing of extraction of the symbol points by symbol timing extractors 32a–32d based on the correct symbol timing thus calculated. Thereby, the symbol points can be extracted at the correct timing.

In the structure of the radio reception apparatus illustrated in FIG. 8, functions of portions following quadrature detectors 4a–4d can be achieved via software by the digital signal processing portions such as a Digital Signal Processor (DSP). The foregoing operation of the radio reception apparatus according to the second embodiment of the invention is executed by software in accordance with flowcharts of FIGS. 10 to 12. The digital signal processor reads a program having steps in these flowcharts from a memory (not shown), and executes it. This program can be externally installed.

Symbol timing detecting circuit 35 in FIG. 8 performs the operation of detecting the data of square of the magnitude of the correlation value between the array composite output and the reference data. This operation is substantially the same as the operation of the first embodiment illustrated in FIG. 3, and therefore description thereof is not repeated.

Figure 10:
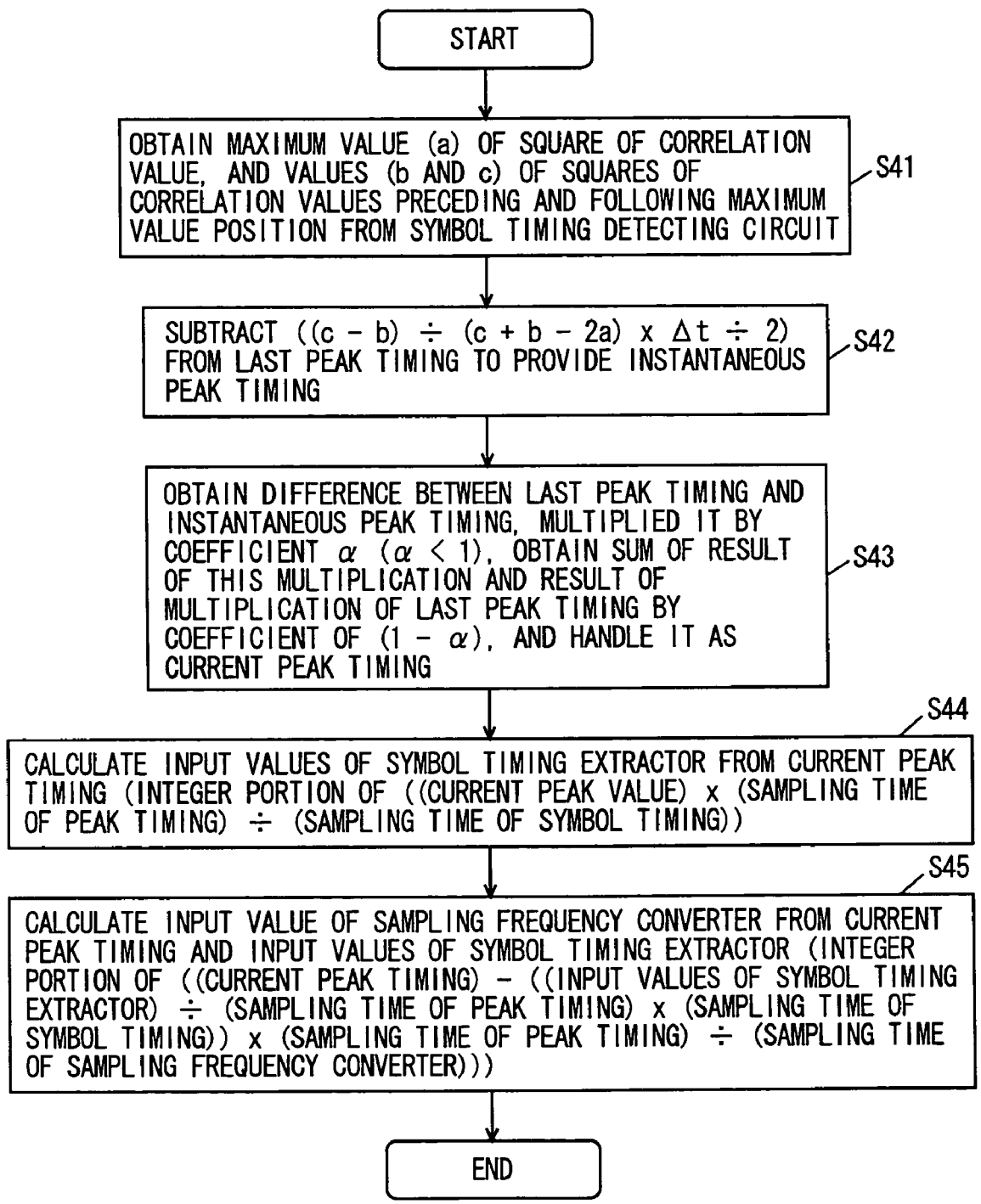
FIGS. 10–12 are flow diagrams illustrating an operation of the radio reception apparatus according to the second embodiment of the invention.

A flowchart of FIG. 10 corresponds to the flowchart of FIG. 4 illustrating the first embodiment, and represents the operation of forming the data of correct symbol timing.

In a step S41 illustrated in FIG. 10, symbol timing deviation detecting circuit 36 obtains, from symbol timing detecting circuit 35, maximum value a of the square data (FIG. 9) of the correlation value calculated by symbol timing detecting circuit 35 as well as values b and c of the square data preceding and following the maximum value position.

In a following step S42, symbol timing deviation detecting circuit 36 calculates the deviation width of the symbol point from the original peak point by effecting the quadratic curve approximation on these three points.

As already described, the deviation expressed by $((c-b) \div (c+b-2a) \times \Delta t \div 2)$ is calculated, and the result of this calculation is subtracted from the timing of peak obtained by the last calculation. The result thus obtained is handled as an instantaneous peak timing.

In a step S43, calculation is performed to obtain a difference between the peak timing in the last calculation and the instantaneous peak timing. This difference is multiplied by a coefficient of α (α<1), and a sum of the result of this multiplication and a result of multiplication of the last peak timing by a coefficient of (1−α) is obtained and handled as the current peak timing.

In a next step S44, input values to be applied to symbol timing extractors 32a–32d are calculated from the current peak timing. More specifically, the current peak timing value is multiplied by the sampling time of the peak timing, and the result thus obtained is divided by the sampling time of the symbol timing. An integer portion of the result thus obtained is calculated, and is used as the input value.

In a step S45, input values to be applied to sampling frequency converters 31a–31d are calculated from the current peak timing and the foregoing input values of the symbol timing extractors. More specifically, a result of the division of the input value of the symbol timing extractor by the sampling time of the peak timing is obtained, and this results is multiplied by the sampling time of the symbol timing. The result of this multiplication is subtracted from the current peak timing described above, and the result of this subtraction is multiplied by the sampling time of the peak timing, and is further is divided by the sampling time of the sampling frequency converter. An integer portion of the result thus obtained is handled as the input value.

Figure 11:
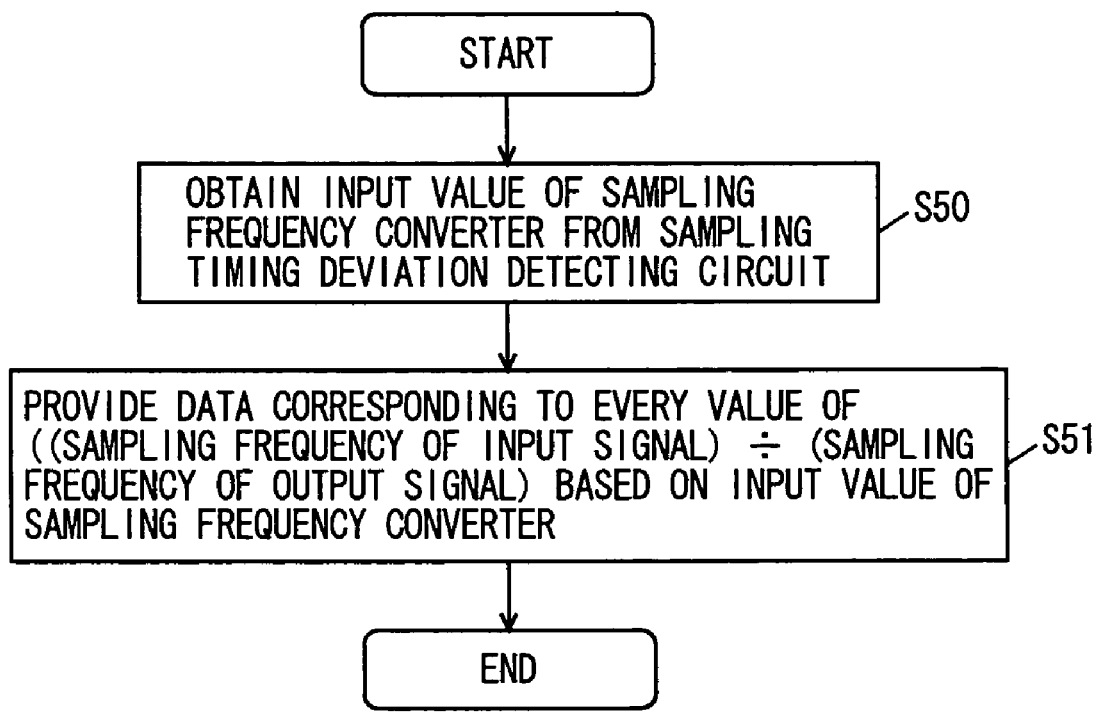

A flow diagram of FIG. 11 corresponds to the flow diagram of FIG. 6 illustrating the first embodiment, and illustrates an operation of changing the sampling timing in sampling frequency converters 31a–31d.

Referring to FIG. 11, an operation is first performed in a step S50 to obtain the input values to be applied to sampling frequency converters 31a–31d, which are calculated by the sampling timing deviation detecting circuit 36 in step S45 illustrated in FIG. 10.

In a next step S51, sampling frequency converters 31a–31d provide data corresponding to every value obtained by dividing the sampling frequency of the input signal by the sampling frequency of the output signal based on the input values of the sampling frequency converters.

Figure 12:
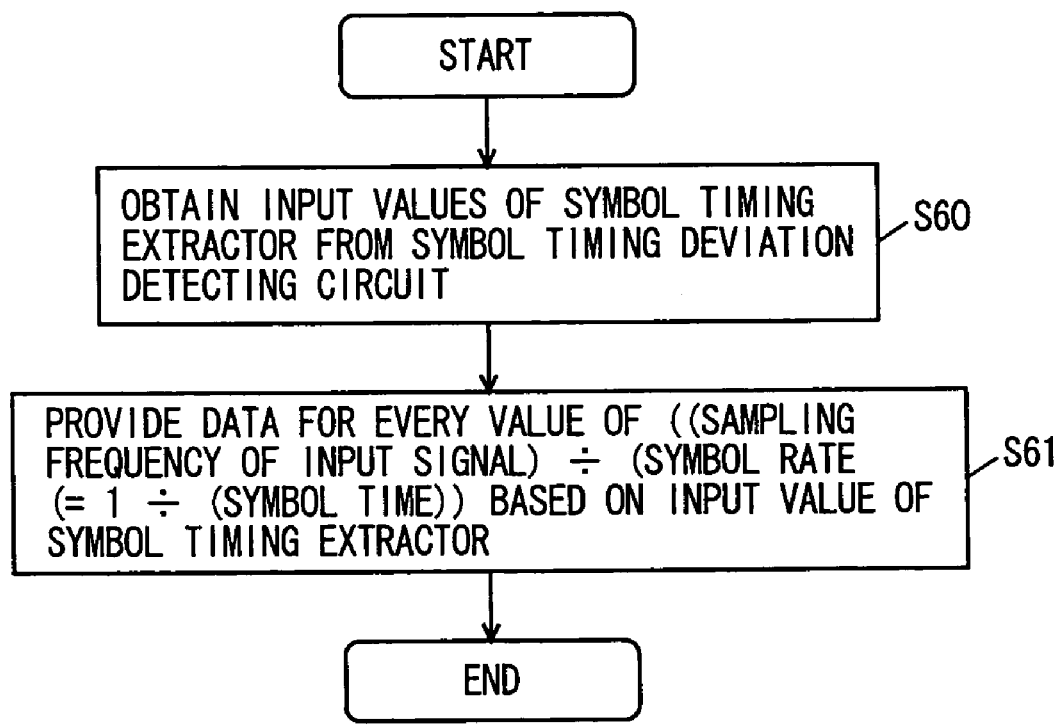

FIG. 12 is a flowchart illustrating an operation of extracting the symbol timing in each of sampling timing extractors 32a–32d.

Referring to FIG. 12, in a step S60 the input values to be applied to symbol timing extractors 32a–32d are first obtained. These input values are calculated by the sampling timing deviation detecting circuit 36 in step S44 illustrated in FIG. 10.

In a step S61, symbol timing extractors 32a–32d provide the data for every value obtained by dividing the sampling frequency of the input signal by a symbol rate (=1÷(symbol time)) based on the input values of the symbol timing extractors.

Through the foregoing processing, symbol timing extractors 32a–32d extract the symbol point at the correct timing, and determining portion 10 in the following stage determines the correct symbol point by the 16-QAM method.

In particular, this second embodiment is configured to perform the symbol timing detection based on the array composite output obtained by the adaptive array processing. Thus, according to the adaptive array technology used by reception directivity control circuit 33 in FIG. 8, signals obtained by the plurality of antennas are appropriately weighted, and then are combined so that unnecessary signal components such as noises and interference waves are removed.

As already described, the reception directivity formation information provided from reception directivity control circuit 33 is a reception weight vector used for the weighting. The symbol timing is detected by using the correlation value between the reference data and the array composite signal, which is prepared by effecting the weighting with the above reception weight vector on the digital signal not yet subjected to the extraction by the symbol timing extractor. This can improve the accuracy of the symbol timing detection.

The embodiments have been described in connection with the cases where 16-QAM method is employed as the multivalued modulation method. However, the invention can be applied to the multivalued modulation method other than the 16-QAM method.

Also, the embodiments have been described in connection with the cases where the invention is applied to the base station of PHS, the invention can be naturally applied to a mobile station.

The PHS employs TDMA (Time Division Multiple Access) for performing the control in the foregoing embodiments for each of time-divided users. However, the invention can be applied to methods other than the TDMA method, and can be applied to a mobile communication system utilizing CDMA (Code Division Multiple Access).

The embodiments have been described in connection with examples, in which the band-limiting filter is formed of the digital filter. However, the invention can be applied to the case, in which the band-limiting filter is formed of an analog BPF (band-pass filter).

The embodiments have been described in connection with cases, in which the plurality of antennas are four in number. However, the invention can be applied to the cases employing the antennas other than four in number.

In the mobile communication system such as PHS, which employs the multivalued modulation method such as 16-QAM for enabling fast and large-capacity transmission, the invention can correct the deviated sampling timing of the symbol point in the frequency converting means to achieve the correct original timing, and thereby can prevent occurrence of a reception error due to the deviation of the sampling timing.

INDUSTRIAL APPLICABILITY

The radio reception apparatus, symbol timing control method and symbol timing control program according to the invention can correct the deviated sampling timing of the symbol point to achieve the correct original timing even in the case of the low sampling frequency, and therefore are effective particularly in the radio reception apparatus of the mobile communication system employing the multivalued modulation method.

The invention claimed is:

1. A radio reception apparatus for receiving a signal subjected to multivalued modulation, and effecting digital processing on the received signal, comprising:
   a signal converter connected to receive the signal subjected to multivalued modulation as an input signal and convert said input signal to a first digital signal having a first sampling frequency;
   a frequency converter connected to receive said first digital signal and to produce a second digital signal having a second sampling frequency;
   a symbol timing detector connected to receive said second digital signal and to detect a timing of a symbol point in said second digital signal;
   a signal extractor connected to receive said second digital signal and to extract the symbol point of said detected timing from said second digital signal;
   a signal processor connected to receive the output of the signal extractor and to effect predetermined digital signal processing on said extracted symbol point; and
   a timing deviation detector connected to receive the second digital signal and to detect a deviation of the timing of said symbol point detected by said symbol timing detector from timing of a correct symbol point, wherein
   said frequency converter controls the timing of sampling of said first digital signal in accordance with the deviation of the timing detected by said timing deviation detector such that said symbol timing detector detects the symbol point at the timing of the correct symbol point;
   wherein said symbol timing detector determines timing when a correlation value between said second digital signal and a predetermined reference signal takes a maximum value as the timing of the symbol point in said second digital signal; and
   wherein said timing deviation detector calculates a magnitude and a direction of said deviation based on a relationship between magnitudes of the correlation values preceding and following said maximum value, respectively, and a magnitude of said maximum value.

2. The radio reception apparatus according to claim 1, wherein said timing deviation detector includes:
a divider to calculate a difference between squares of the magnitudes of the correlation values preceding and following said maximum value, respectively, and to divide the calculated difference by a square of the magnitude of said maximum value;
an accumulator to compare a value obtained by said division with a predetermined threshold value, and to accumulate said obtained value if said obtained value is larger than said threshold value;
a repeater circuit to repeat the division by said divider and the accumulation by said accumulator a predetermined number of times; and
a magnitude determining circuit to determine a magnitude of said deviation based on a magnitude of a result of said accumulation by said accumulator repeated said predetermined number of times, and determining a direction of said deviation based on a sign of the result of said accumulation.

3. The radio reception apparatus according to claim 1, wherein
said frequency converter corrects a reference position of the sampling of said first digital signal based on said calculated magnitude and direction of the deviation.

4. The radio reception apparatus according to claim 1, further comprising:
a filter arranged between said frequency converter and said symbol timing detector for effecting band limitation on said second digital signal.

5. A radio reception apparatus for receiving a signal subjected to multivalued modulation by a plurality of antennas, and effecting digital processing on the received signal, comprising:
a plurality of signal converters to convert a plurality of signals received by said plurality of antennas to a plurality of first digital signals having a first sampling frequency, respectively;
a plurality of frequency converters connected to said plurality of first digital signals, and to convert said first digital signals to a plurality of second digital signals having a second sampling frequency;
a symbol timing detector connected to detect a timing of a symbol point in a second digital signal having a relatively high signal level among said plurality of second digital signals;
a signal extractor to extract the symbol point of said detected timing from the second digital signal having a relative high level among said plurality of second digital signals;
a signal processor connected to receive the output of said signal extractor and to effect predetermined digital signal processing on said extracted symbol point;
a timing deviation detector connected to receive the second digital signal having a relative high level among said plurality of second digital signals and to detect a deviation of the timing of said symbol point detected by said symbol timing detecting means from the timing of the correct symbol point, wherein
each of said plurality of frequency converters controls the timing of sampling of the corresponding first digital signal in accordance with the deviation of the timing detected by said timing deviation detector such that said symbol timing detecting means detects the symbol point at the timing of the correct symbol point;
wherein said symbol timing detector determines timing when a correlation value between the second digital signal of said relatively high signal level and a predetermined reference signal takes a maximum value as the timing of the symbol point in said second digital signal; and
wherein said timing deviation detector calculates a magnitude and a direction of said deviation based on a relationship between magnitudes of the correlation values preceding and following said maximum value, respectively, and a magnitude of said maximum value.

6. The radio reception apparatus according to claim 5, wherein
said timing deviation detector includes:
a divider to calculate a difference between squares of the magnitudes of the correlation values preceding and following said maximum value, respectively, and to divide the calculated difference by a square of the magnitude of said maximum value;
an accumulator to compare a value obtained by said division with a predetermined threshold value, and to accumulate said obtained value if said obtained value is larger than said threshold value;
a repeater circuit to repeat the division by said divider and the accumulation by said accumulator a predetermined number of times; and
a magnitude determining circuit to determine a magnitude of said deviation based on a magnitude of a result of said accumulation by said accumulator repeated said predetermined number of times, and determining a direction of said deviation based on a sign of the result of said accumulation.

7. The radio reception apparatus according to claim 5, wherein
each of said plurality of frequency converters corrects a reference position of the sampling of the corresponding first digital signal based on said calculated magnitude and direction of the deviation.

8. The radio reception apparatus according to claim 5, further comprising:
a plurality of filters arranged between said plurality of frequency converters and said symbol timing detectors for effecting band limitation on said plurality of second digital signals, respectively.

9. A radio reception apparatus for receiving a signal subjected to multivalued modulation by a plurality of antennas, and effecting adaptive array processing on the received signal, comprising:
a plurality of signal converters connected to receive a plurality of signals received by said plurality of antennas and to convert said signals to a plurality of first digital signals having a first sampling frequency, respectively;
a plurality of frequency converters each connected to receive at least a respective one of said said plurality of first digital signals, and to convert said first digital signals to a plurality of second digital signals having a second sampling frequency;
a symbol timing detector connected to receive said second plurality to digital signals and to detect a timing of a symbol point in said plurality of second digital signals;
a plurality of signal extractors connected to receive said second digital signal and to extract the symbol points from said plurality of second digital signals;
a signal processor to effect predetermined digital signal processing on said extracted symbol point;
a timing deviation detector to detect a deviation of the timing of said symbol point detected by said symbol timing detector from the timing of the correct symbol point; and a reception directivity forming circuit to effect adaptive array processing on said plurality of second digital signals to form an array composite output having controlled reception directivity, wherein said symbol timing detector calculates data relating to a correlation value between said array composite output and a predetermined reference signal, and applies said data to said timing deviation detector, and said timing deviation detector effects quadratic curve approximation on a value of the maximum symbol point and values preceding and following said maximum symbol point of the data related to said correlation value applied from said symbol timing detecting means, thereby detects a deviation of the timing of said maximum symbol point from timing of a correct symbol point, and controls timing of sampling of said plurality of first digital signals of said plurality of frequency converter and timing of symbol point extraction of said plurality of signal extractor based on said detected deviation of the timing.

10. A symbol timing control method in a radio reception apparatus receiving a signal subjected to multivalued modulation, and effecting digital processing on the received signal, comprising the steps of:

converting the received signal to a first digital signal having a first sampling frequency;

sampling said first digital signal to convert said first digital signal to a second digital signal having a second sampling frequency;

detecting timing of a symbol point in said second digital signal;

extracting the symbol point of said detected timing from said second digital signal;

effecting predetermined digital signal processing on said extracted symbol point; and detecting a deviation of the detected timing of said symbol point from the timing of a correct symbol point, wherein said step of sampling said first digital signal controls the timing of the sampling of said first digital signal in accordance with said detected deviation of the timing such that the symbol point is detected at the timing of the correct symbol point;

wherein said step of detecting the timing of said symbol point is performed to determine timing when a correlation value between said second digital signal and a predetermined reference signal takes a maximum value as the timing of the symbol point in said second digital signal; and wherein said step of detecting the deviation of the timing is performed to calculate a magnitude and a direction of said deviation based on a relationship between magnitude of the correlation values preceding and following said maximum value, respectively, and a magnitude of said maximum value.

11. The symbol timing control method according to claim 10, wherein said step of detecting the deviation of the timing includes the steps of:

calculating a difference between squares of the magnitudes of the correlation values preceding and following said maximum value, respectively, and dividing the calculated difference by a square of the magnitude of said maximum value;

comparing a value obtained by said division with a predetermined threshold value, and accumulating said obtained value if said obtained value is larger than said threshold value;

repeating said division and said accumulation a predetermined number of times; and determining a magnitude of said deviation based on a magnitude of a result of said accumulation repeated said predetermined number of times, and determining a direction of said deviation based on a sign of the result of said accumulation.

12. The symbol timing control method according to claim 10, wherein said step of sampling said first digital signal is performed to correct a reference position of the sampling of said first digital signal based on said calculated magnitude and direction of the deviation.

13. The symbol timing control method according to claim 10, further comprising:

a step of effecting band limitation on said second digital signal.

14. A symbol timing control method in a radio reception apparatus receiving a signal subjected to multivalued modulation by a plurality of antennas, and effecting adaptive array processing on the received signal, comprising the steps of:

converting a plurality of signals received by said plurality of antennas to a plurality of first digital signals having a first sampling frequency, respectively;

sampling said plurality of first digital signals to convert said first digital signals to a plurality of second digital signals having a second sampling frequency;

detecting timing of a symbol point in said plurality of second digital signals;

extracting the symbol points from said plurality of second digital signals;

effecting predetermined digital signal processing on said extracted symbol point;

detecting a deviation of the timing of said detected symbol point from the timing of the correct symbol point; and effecting adaptive array processing on said plurality of second digital signals to form an array composite output having controlled reception directivity, wherein said step of detecting the timing of said symbol point includes a step of calculating data relating to a correlation value between said array composite output and a predetermined reference signal, and said step of detecting the timing deviation includes the steps of:

effecting quadratic curve approximation on a value of the maximum symbol point and values preceding and following said maximum symbol point of the data related to said correlation value, and thereby detecting a deviation of the timing of said maximum symbol point from timing of a correct symbol point, and controlling timing of sampling of said plurality of first digital signals and timing of said symbol point extraction based on said detected deviation of the timing.

15. A symbol timing control program in a radio reception apparatus receiving a signal subjected to multivalued modulation, and effecting digital processing on the received signal, causing a computer to execute the steps of:

converting the received signal to a first digital signal having a first sampling frequency;

sampling said first digital signal to convert said first digital signal to a second digital signal having a second sampling frequency;

detecting timing of a symbol point in said second digital signal;

extracting the symbol point of said detected timing from said second digital signal;

effecting predetermined digital signal processing on said extracted symbol point; and detecting a deviation of the detected timing of said symbol point from the timing of a correct symbol point, wherein said step of sampling said first digital signal controls the timing of the sampling of said first digital signal in accordance with said detected deviation of the timing such that the symbol point is detected at the timing of the correct symbol point;

wherein said step of detecting the timing of said symbol point is performed to determine timing when a correlation value between said second digital signal and a predetermined reference signal takes a maximum value as the timing of the symbol point in said second digital signal; and wherein said step of detecting the deviation of the timing is performed to calculate a magnitude and a direction of said deviation based on a relationship between magnitudes of the correlation values preceding and following said maximum value, respectively, and a magnitude of said maximum value.

16. The symbol timing control program according to claim 15, wherein said step of detecting the deviation of the timing includes the steps of:

calculating a difference between squares of the magnitudes of the correlation values preceding and following said maximum value, respectively, and dividing the calculated difference by a square of the magnitude of said maximum value;

comparing a value obtained by said division with a predetermined threshold value, and accumulating said obtained value if said obtained value is larger than said threshold value;

repeating said division and said accumulation a predetermined number of times; and determining a magnitude of said deviation based on a magnitude of a result of said accumulation repeated said predetermined number of times, and determining a direction of said deviation based on a sign of the result of said accumulation.

17. The symbol timing control program according to claim 15, wherein said step of sampling said first digital signal is performed to correct a reference position of the sampling of said first digital signal based on said calculated magnitude and direction of the deviation.

18. The symbol timing control program according to claim 15, further causing the computer to execute the step of effecting band limitation on said second digital signal.

19. A symbol timing control program in a radio reception apparatus receiving a signal subjected to multivalued modulation by a plurality of antennas, and effecting adaptive array processing on the received signal, causing a computer to execute the steps of:

converting a plurality of signals received by said plurality of antennas to a plurality of first digital signals having a first sampling frequency, respectively;

sampling said plurality of first digital signals to convert said first digital signals to a plurality of second digital signals having a second sampling frequency;

detecting timing of a symbol point in said plurality of second digital signals;

extracting the symbol points from said plurality of second digital signals;

effecting predetermined digital signal processing on said extracted symbol point;

detecting a deviation of the timing of said detected symbol point from the timing of the correct symbol point; and effecting adaptive array processing on said plurality of second digital signals to form an array composite output having controlled reception directivity, wherein said step of detecting the timing of said symbol point includes a step of calculating data relating to a correlation value between said array composite output and a predetermined reference signal, and said step of detecting the timing deviation includes the steps of:

effecting quadratic curve approximation on a value of the maximum symbol point and values preceding and following said maximum symbol point of the data related to said correlation value, and thereby detecting a deviation of the timing of said maximum symbol point from timing of a correct symbol point, and controlling timing of sampling of said plurality of first digital signals and timing of said symbol point extraction based on said detected deviation of the timing.

* * * * *